US009454794B2

(12) United States Patent
Yamanaka

(10) Patent No.: US 9,454,794 B2
(45) Date of Patent: Sep. 27, 2016

(54) IMAGE PROCESSING APPARATUS, IMAGE PROCESSING METHOD, AND PROGRAM

(71) Applicant: Sony Corporation, Tokyo (JP)

(72) Inventor: Masanori Yamanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 14/205,409

(22) Filed: Mar. 12, 2014

(65) Prior Publication Data

US 2014/0285483 A1 Sep. 25, 2014

(30) Foreign Application Priority Data

Mar. 25, 2013 (JP) .................. 2013-061953

(51) Int. Cl.
  *G06T 1/60* (2006.01)
  *G06T 3/40* (2006.01)
  *H04N 13/00* (2006.01)
  *H04N 7/01* (2006.01)
  *G09G 5/393* (2006.01)

(52) U.S. Cl.
  CPC . *G06T 1/60* (2013.01); *G06T 3/40* (2013.01); *G09G 5/393* (2013.01); *H04N 7/0117* (2013.01); *H04N 13/0029* (2013.01); *G09G 2310/021* (2013.01); *G09G 2310/0205* (2013.01); *G09G 2310/0213* (2013.01); *G09G 2310/0229* (2013.01); *G09G 2310/0283* (2013.01); *G09G 2340/04* (2013.01); *G09G 2340/0442* (2013.01)

(58) Field of Classification Search
  CPC .................................. G06T 1/60; G06T 3/40
  USPC ............................................................ 348/42
  See application file for complete search history.

(56) References Cited

U.S. PATENT DOCUMENTS

| 4,680,599 A | * | 7/1987 | Wertz | ................ H04N 3/30 345/12 |
| 6,501,507 B1 | * | 12/2002 | Canfield | ............. H04N 7/0135 348/440.1 |
| 2007/0081220 A1 | * | 4/2007 | Yokoyama | .......... G02B 26/123 359/216.1 |
| 2011/0122127 A1 | * | 5/2011 | Ko | .................. H04N 13/0029 345/419 |
| 2012/0119983 A2 | * | 5/2012 | Miyashita | ........... G09G 3/3648 345/93 |

* cited by examiner

*Primary Examiner* — William C Vaughn, Jr.
*Assistant Examiner* — Jae N Noh
(74) *Attorney, Agent, or Firm* — Wolf, Greenfield & Sacks, P.C.

(57) ABSTRACT

Provided is an image processing apparatus, including, a memory unit that stores an input image and read the input image as first image second images, an acquiring unit that acquires an up-conversion line that is a line of pixels used for up conversion from the first and second images, an up-converting unit that performs up conversion using pixels of the up-conversion line, and generate first and second up-converted images obtained by up converting the first and second images, and a generating unit that writes the first and second up-converted images in first and second memory blocks, reads pixels of the first and second up-converted images written in the first and second memory blocks in a certain order decided according to a scan method of a display device configured to display an output image obtained by up converting the input image, and generates the output image according to the scan method.

21 Claims, 20 Drawing Sheets

FIG. 3
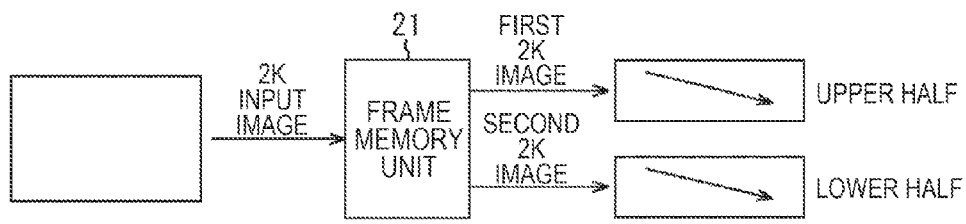
A NORMAL CROSS-IN-SQUARE METHOD
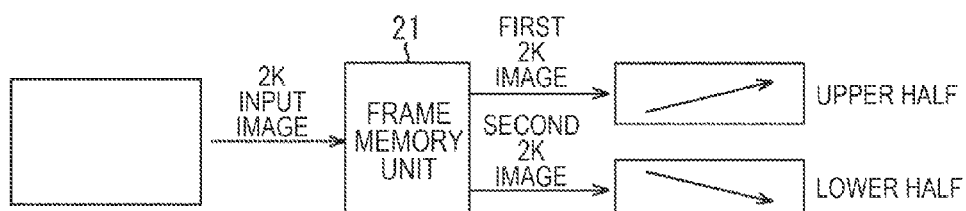
B SPRING CROSS-IN-SQUARE METHOD
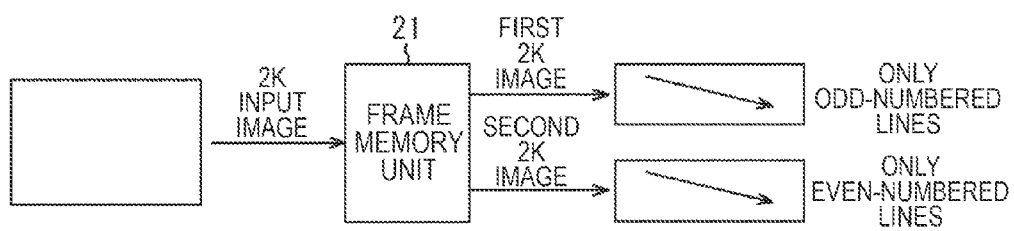
C SINGLE SCREEN METHOD, BAMBOO BLIND METHOD

FIG. 12
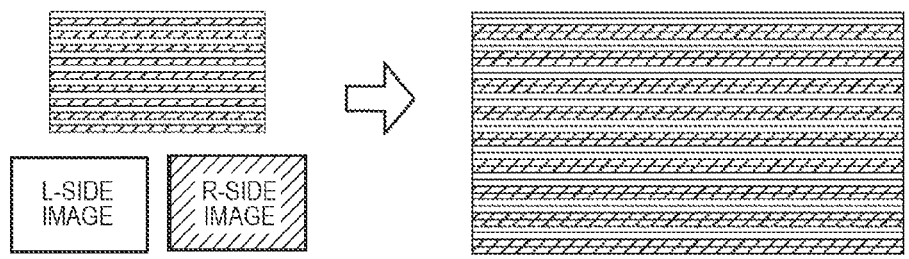
A UP CONVERSION OF 3D IMAGE OF LINE BY LINE METHOD
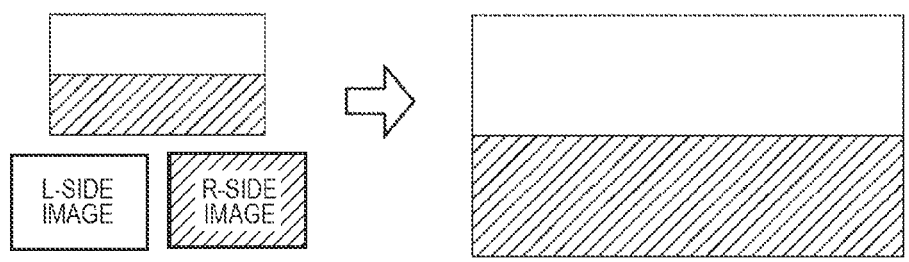
B UP CONVERSION OF 3D IMAGE OF TOP AND BOTTOM METHOD
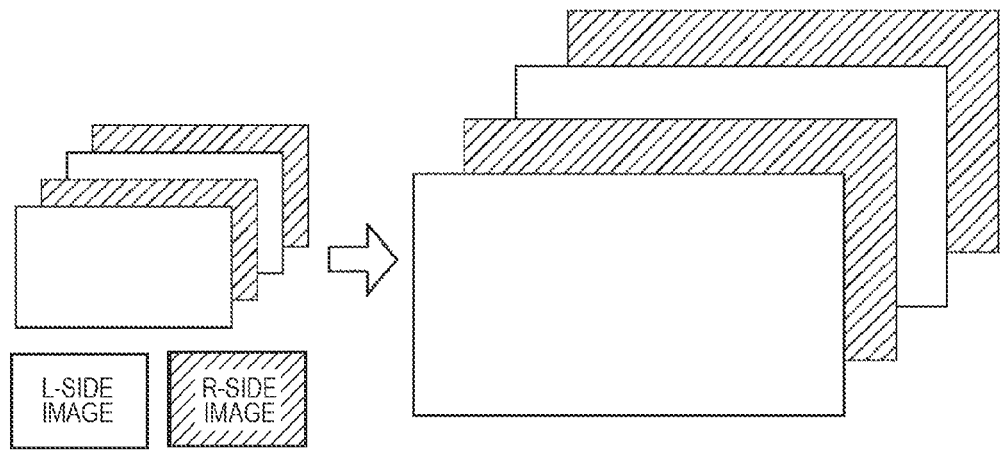
C UP CONVERSION OF 3D IMAGE OF FRAME SEQUENTIAL METHOD FIG. 13
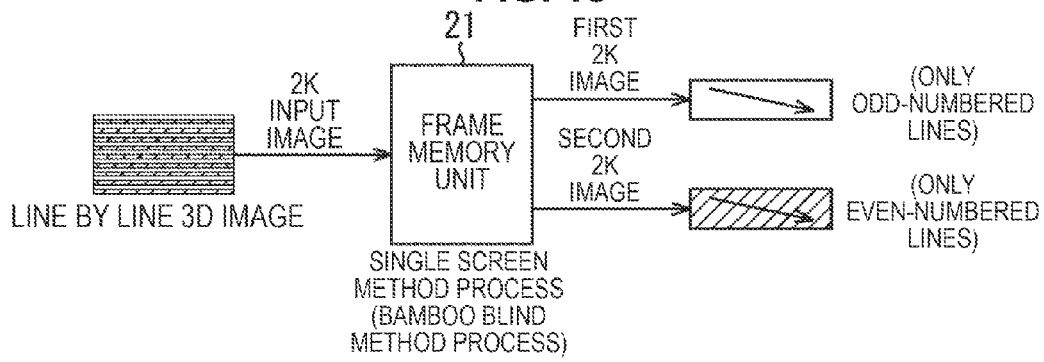
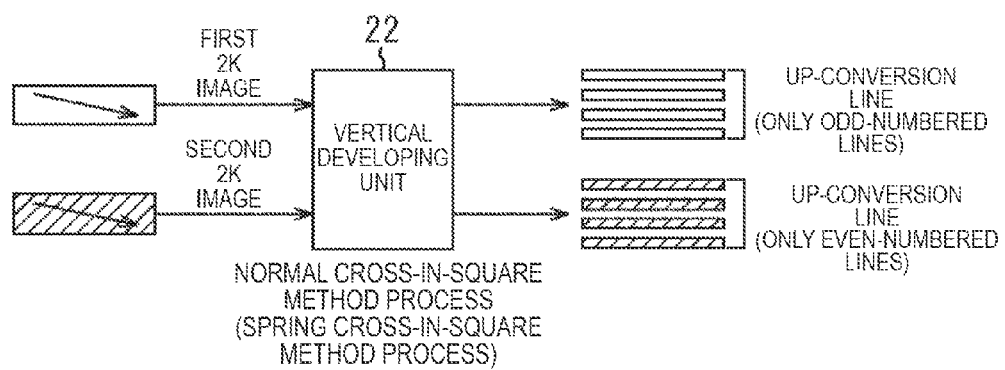
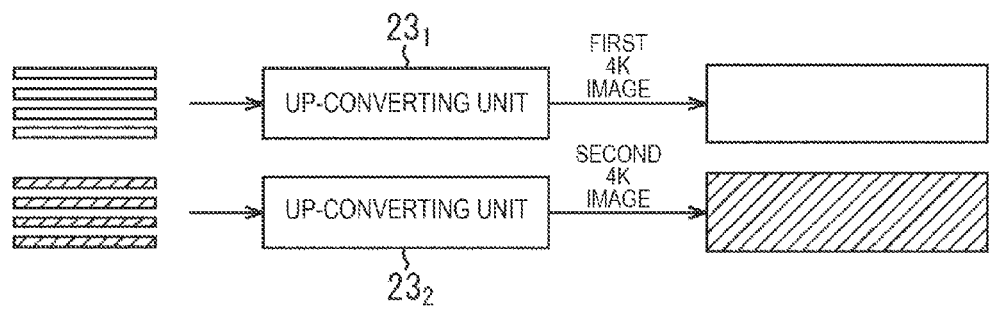
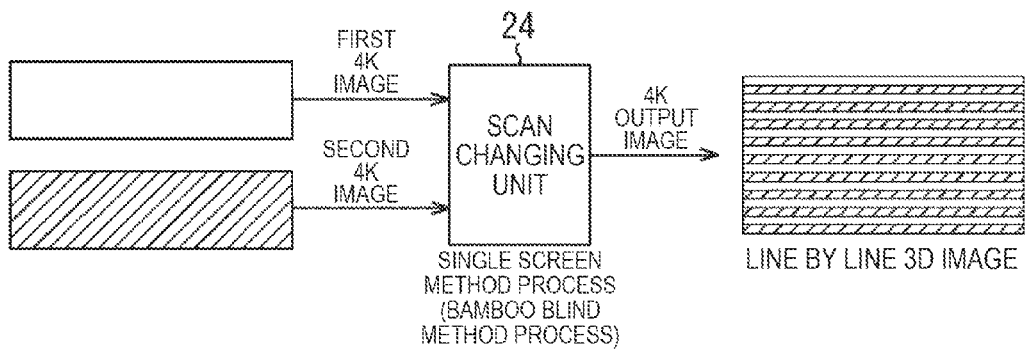

FIG. 14
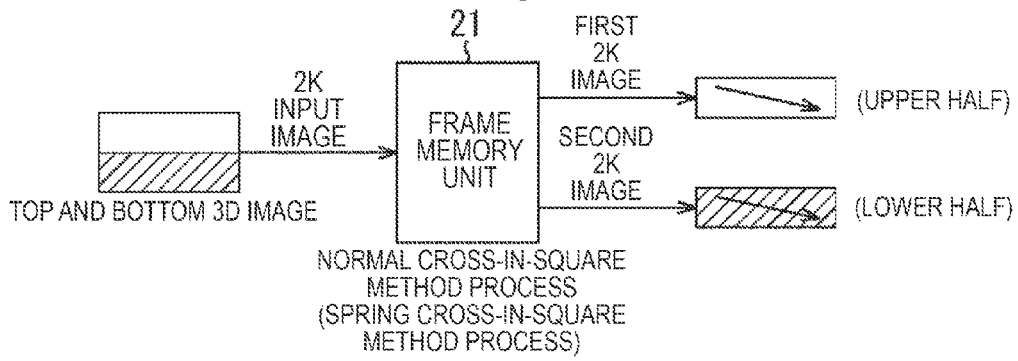
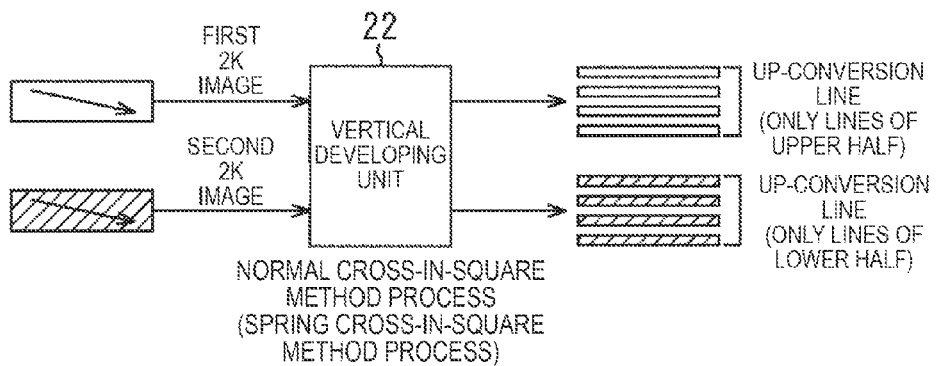
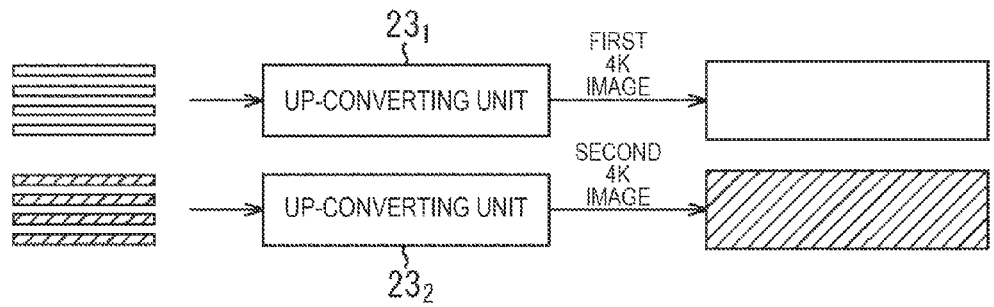
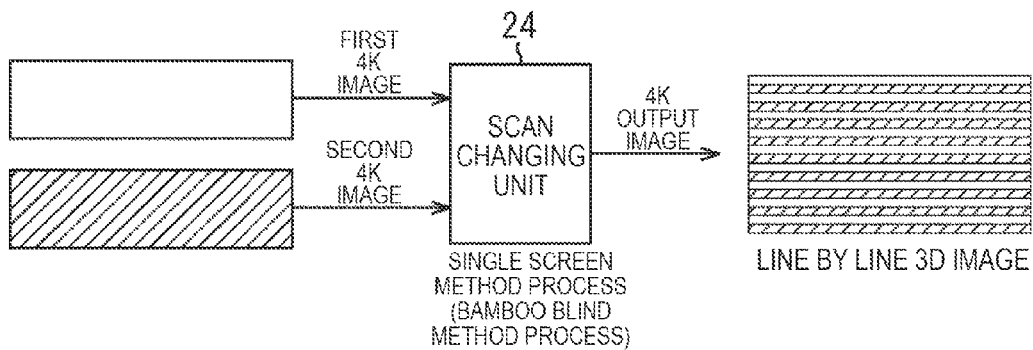

FIG. 15
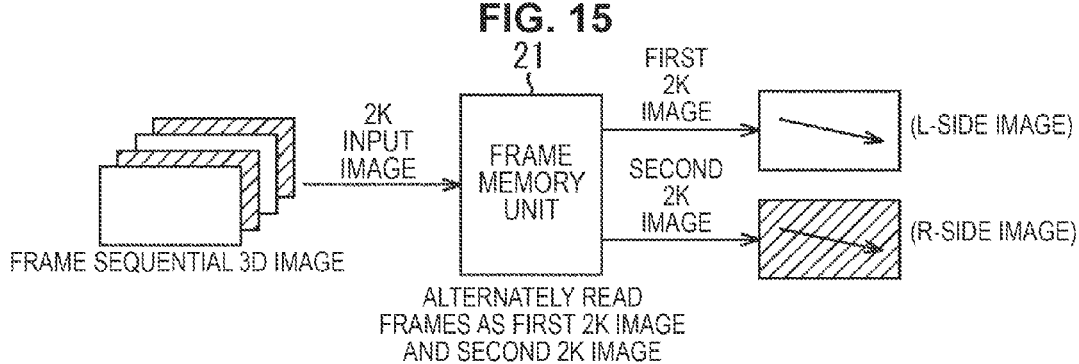
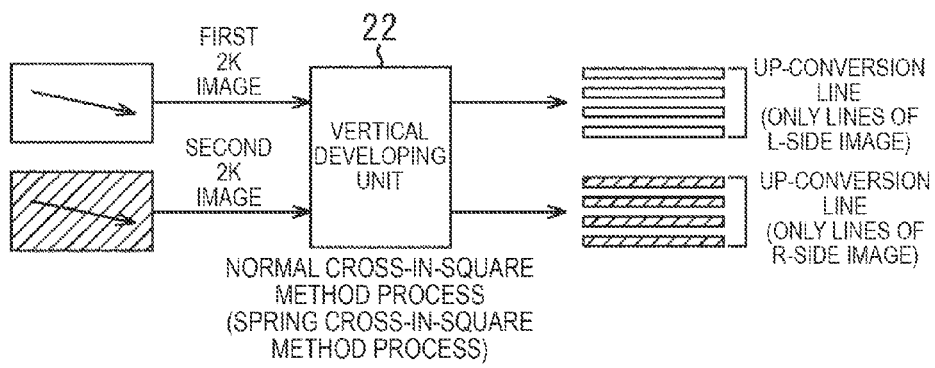
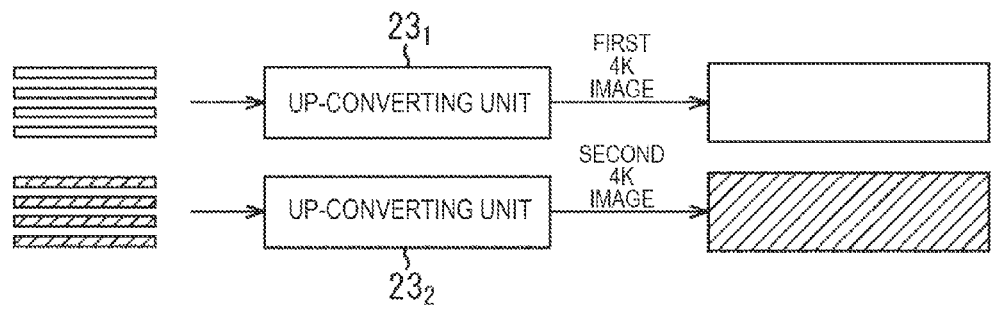
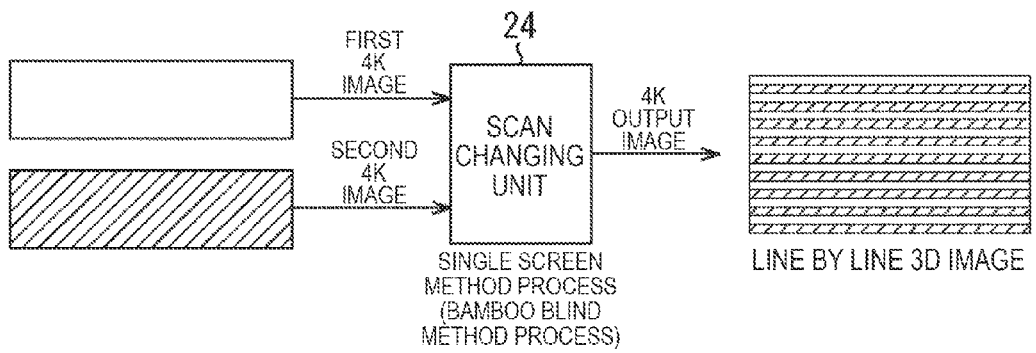

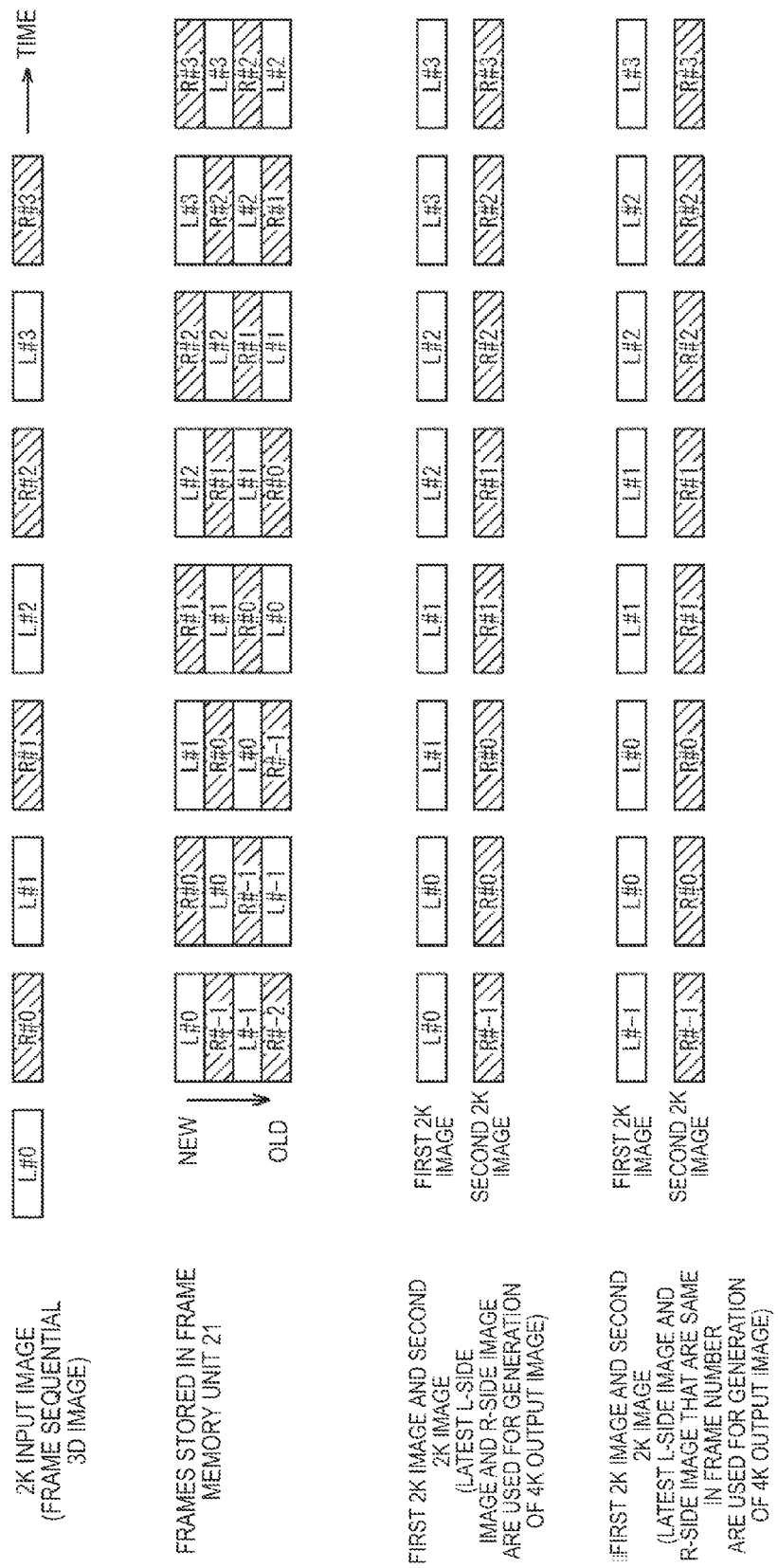

FIG. 17

| INPUT IMAGE | STORAGE CONTENT OF FRAME MEMORY UNIT | READING OF FIRST 2K IMAGE | READING OF SECOND 2K IMAGE | ACQUISITION OF UP-CONVERSION LINE | FIRST 4K IMAGE | SECOND 4K IMAGE | READING | OUTPUT IMAGE |
|---|---|---|---|---|---|---|---|---|
| 2D IMAGE | 2D IMAGE | UPPER HALF | LOWER HALF | INDEPENDENTLY ACQUIRE FROM LINES OF FIRST AND SECOND 2K IMAGES | UPPER HALF OF OUTPUT IMAGE | LOWER HALF OF OUTPUT IMAGE | 2-DIVISIONAL READING | 2D IMAGE OF NORMAL CROSS-IN-SQUARE METHOD 2D IMAGE OF SPRING CROSS-IN-SQUARE METHOD |
| | | ODD-NUMBERED LINES | EVEN-NUMBERED LINES | ACQUIRE BY MIXING LINES OF FIRST AND SECOND 2K IMAGES | ODD-NUMBERED LINES OF OUTPUT IMAGE | EVEN-NUMBERED LINES OF OUTPUT IMAGE | SEQUENTIAL READING | 2D IMAGE OF SINGLE SCREEN METHOD |
| | | ODD-NUMBERED LINES | EVEN-NUMBERED LINES | ACQUIRE BY MIXING LINES OF FIRST AND SECOND 2K IMAGES | ODD-NUMBERED LINES OF OUTPUT IMAGE | EVEN-NUMBERED LINES OF OUTPUT IMAGE | 4-DIVISIONAL READING | 2D IMAGE OF BAMBOO BLIND METHOD |
| LINE BY LINE 3D IMAGE | ODD-NUMBERED LINES: L-SIDE IMAGE EVEN-NUMBERED LINES: R-SIDE IMAGE | ODD-NUMBERED LINES | EVEN-NUMBERED LINES | ACQUIRE FROM LINES OF FIRST AND SECOND 2K IMAGES | ODD-NUMBERED LINES OF OUTPUT IMAGE | EVEN-NUMBERED LINES OF OUTPUT IMAGE | SEQUENTIAL OR 4-DIVISIONAL READING | LINE BY LINE 3D IMAGE |
| TOP AND BOTTOM 3D IMAGE | UPPER HALF: L-SIDE IMAGE LOWER HALF: R-SIDE IMAGE | UPPER HALF | LOWER HALF | ACQUIRE FROM LINES OF FIRST AND SECOND 2K IMAGES | ODD-NUMBERED LINES OF OUTPUT IMAGE | EVEN-NUMBERED LINES OF OUTPUT IMAGE | SEQUENTIAL OR 4-DIVISIONAL READING | LINE BY LINE 3D IMAGE |
| FRAME SEQUENTIAL 3D IMAGE | L-SIDE IMAGE AND R-SIDE IMAGE ARE ALTERNATELY STORED | L-SIDE IMAGE | R-SIDE IMAGE | ACQUIRE FROM LINES OF FIRST AND SECOND 2K IMAGES | ODD-NUMBERED LINES OF OUTPUT IMAGE | EVEN-NUMBERED LINES OF OUTPUT IMAGE | SEQUENTIAL OR 4-DIVISIONAL READING | LINE BY LINE 3D IMAGE | ered to as a "4K display device" as well), and a scan method differs according to a display device.
IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2013-061953 filed Mar. 25, 2013, the entire contents of which are incorporated herein by reference.

BACKGROUND

The present technology relates to an image processing apparatus, an image processing method, and a program, and more particularly, to an image processing apparatus, an image processing method, and a program, which are capable of performing, for example, resolution conversion of both a two dimensional (2D) image and a three dimensional (3D) image at a low cost.

In recent years, display devices have been getting larger.

The resolution of display devices (and images) of so-called 2K resolution (the resolution is 2K) is 1920×1080 pixels. Meanwhile, the resolution of display devices of so-called 4K resolution is 3840×2160 pixels or 4096×2160 pixels.

For example, when an image (a 2K image) of the 2K resolution is displayed on a display device of the 4K resolution, resolution conversion of converting the 2K image into a 4K image is necessary for resolution matching.

For example, a resolution conversion technique of displaying an image on a multi-display in which a plurality of display devices are combined to function as a single display device has been proposed in JP 2003-280623A.

SUMMARY

There is no standard method for scanning a 4K image of a display device of 4K resolution (hereinafter referred to as a "4K display device" as well), and a scan method differs according to a display device.

Examples of the scan method of the 4K display device include a single screen method, a bamboo blind method, a normal cross-in-square method, and a spring cross-in-square method.

As the 4K display device of the single screen method or the bamboo blind method, for example, a 4K display device employing a liquid crystal panel in which a polarizing plate in which polarization characteristics of respective lines are different is disposed on a display screen is implemented. According to the 4K display device, it is possible not only to display a 2D image but also to display a 3D image of a line-by-line method by a combination with polarization glasses (a user can view a 3D image of a line-by-line method using polarization glasses).

However, since a separate device has to be prepared for resolution converting according to a scan methods of a 4K display device or according to whether a resolution conversion target is a 2D image or a 3D image, the cost of an overall device increases.

It is desirable to be able to perform resolution conversion of both a 2D image and a 3D image at a low cost.

According to an embodiment of the present technology, there is provided an image processing apparatus or a program for causing a computer to function as such the image processing apparatus, including a memory unit configured to store an input image and read a part or all of the input image as a first image and a second image, an acquiring unit configured to acquire an up-conversion line that is a line of pixels used for up conversion from the first and second images, an up-converting unit configured to perform up conversion using pixels of the up-conversion line, and generate a first up-converted image obtained by up converting the first image and a second up-converted image obtained by up converting the second image, and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device. When the input image is a three dimensional (3D) image, the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in unit of lines by up converting the 3D image.

According to an embodiment of the present technology, there is provided an image processing method, including storing an input image and reading a part or all of the input image as a first image and a second image, acquiring an up-conversion line that is a line of pixels used for up conversion from the first and second images, performing up conversion using pixels of the up-conversion line, and generating a first up-converted image obtained by up converting the first image and a second up-converted image obtained by up converting the second image, writing the first up-converted image in a first memory block and writing the second up-converted image in a second memory block, reading pixels of the first up-converted image written in the first memory block in a certain order decided according to a scan method of a display device configured to display an output image obtained by up converting the input image, reading pixels of the second up-converted image written in the second memory block in the certain order, and generating the output image according to the scan method of the display device. When the input image is a three dimensional (3D) image, in the reading of the first and second images, an L-side image viewed with a left eye in the 3D image is read as the first image, and an R-side image viewed with a right eye is read as the second image, in the acquiring of the up-conversion line, a first up-conversion line that is a line of pixels used for up conversion for generating the first up-converted image is acquired from the first image, and a second up-conversion line that is a line of pixels used for up conversion for generating the second up-converted image is acquired from the second image, and in the generating of the output image, an up-converted 3D image of a line-by-line method in which the pixels of the first up-converted image written in the first memory block and the pixels of the second up-converted image written in the second memory block are alternately arranged in units of lines is generated by up converting the 3D image.

According to an embodiment of the present technology, an input image is to be stored and a part or all of the input image is to be read as a first image and a second image. An up-conversion line that is a line of pixels used for up conversion is to be acquired from the first and second images. Up conversion is to be performed using pixels of the up-conversion line, and a first up-converted image obtained by up converting the first image and a second up-converted image obtained by up converting the second image are to be generated. The first up-converted image is to be written in a first memory block, the second up-converted image is to be written in a second memory block, pixels of the first up-converted image written in the first memory block is to be read in a certain order decided according to a scan method of a display device configured to display an output image obtained by up converting the input image, pixels of the second up-converted image written in the second memory block is to be read in the certain order, and the output image is to be generated according to the scan method of the display device. When the input image is a three dimensional (3D) image, the memory unit reads an L-side image viewed with a left eye in the 3D image as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in units of lines by up converting the 3D image.

Further, the image processing apparatus may be an independent apparatus or may be one of internal blocks configuring one apparatus.

Further, the program may be provided such that the program is transmitted through a transmission medium or recorded in a recording medium.

According to one or more embodiments of the present technology, it is possible to perform resolution conversion of an image. Particularly, it is possible to perform, for example, resolution conversion of both a 2D image and a 3D image at a low cost.

BRIEF DESCRIPTION OF THE DRAWINGS

FIGS. 3A to 3C are diagrams for describing processing of a frame memory unit 21 when a 2K input image is a 2D image;

FIG. 12 is a diagram for describing up conversion of a 3D image;

FIG. 13 is a diagram for describing a resolution conversion process performed by an image processing unit 12 when a 2K input image is a 3D image of a line-by-line method;

FIG. 14 is a diagram for describing a resolution conversion process performed by the image processing unit 12 when a 2K input image is a 3D image of a top- and bottom method;

FIG. 15 is a diagram for describing a resolution conversion process performed by the image processing unit 12 when a 2K input image is a 3D image of a frame sequential method;

FIG. 16 is a diagram for describing storage content of a frame memory unit 21 and first and second 2K images for a frame sequential 3D image;

FIG. 17 is a diagram for describing operations of the respective blocks configuring the image processing unit 12;

DETAILED DESCRIPTION OF THE EMBODIMENT(S)

Figure 1:
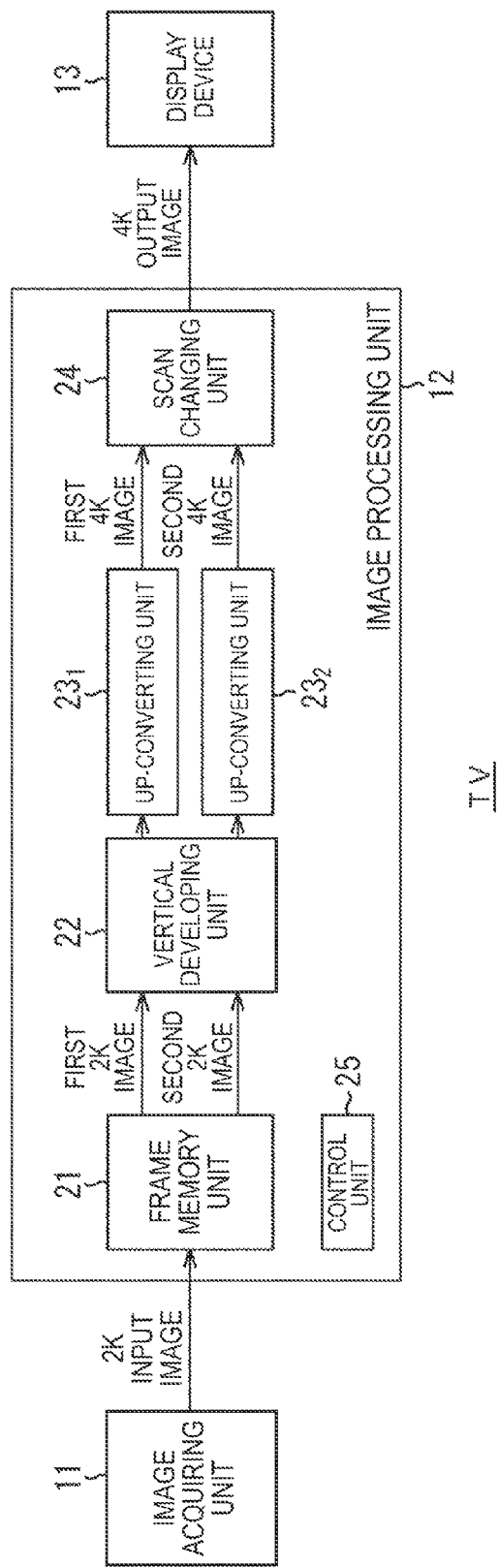
FIG. 1 is a block diagram illustrating an exemplary configuration of an embodiment of a television to which an embodiment of the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<Embodiment of Television to which Present Technology is Applied>

FIG. 1 is a block diagram illustrating an exemplary configuration of an embodiment of a television (television receiver) to which the present technology is applied.

Referring to FIG. 1, a television includes an image acquiring unit 11, an image processing unit 12, and a display device 13.

For example, the image acquiring unit 11 is configured with a tuner, a network interface, or the like. The image acquiring unit 11 receives a terrestrial or other television broadcast program or receives content from a server on the Internet, acquires an image, and supplies the image to the image processing unit 12 as an input image that inputs the image to the image processing unit 12.

Here, the input image is assumed to be, for example, an image (2K image) having a resolution of 2K. The input image that is the 2K image is also referred to as a "2K input image."

The image processing unit 12 performs resolution conversion of converting the resolution of the 2K input image received from the image acquiring unit 11 into a resolution matching a resolution of the display device 13, and supplies an image obtained by the resolution conversion to the display device 13 as an output image to be output on the display device 13.

The display device 13 is, for example, a display device having a resolution of 4K (the 4K display device), and displays the output image supplied from the image processing unit 12 according to a certain scan method.

As the scan method of the display device 13, for example, the single screen method, the bamboo blind method, the normal cross-in-square method, the spring cross-in-square method, or the like may be employed.

As the 4K display device of the single screen method or the bamboo blind method, for example, a liquid crystal panel in which a polarizing plate in which polarization characteristics of respective lines are different is arranged on a display screen may be employed. When the 4K display device is employed as the display device 13, it is possible not only to display a 2D image but also to display a 3D image of a line-by-line method by a combination with polarization glasses.

Here, as described above, when the input image is the 2K image and the display device 13 is the 4K display device, the image processing unit 12 performs resolution conversion of converting the 2K image into the 4K image.

Referring to FIG. 1, the image processing unit 12 includes a frame memory unit 21, a vertical developing unit 22, up-converting units $23_1$ and $23_2$, a scan changing unit 24, and a control unit 25.

The frame memory unit 21 has the memory capacity capable of storing 2K images of one or more frames. The frame memory unit 21 stores the 2K input image supplied from the image acquiring unit 11 in units of frames, reads some or all (frames of) the 2K input images as a first 2K image and a second 2K image, and supplies the first 2K image and the second 2K image to the vertical developing unit 22. In the frame memory unit 21, the first 2K image and the second 2K image may be read in parallel.

The vertical developing unit 22 functions as an acquiring unit for acquiring an up-conversion line that is a line of pixels used for up conversion from the first 2K image and the second 2K image supplied from the frame memory unit 21, and supplies the up-conversion line to the up-converting units $23_1$ and $23_2$.

The up-converting unit $23_1$ generates a first 4K image having the resolution of 4K as a first up-converted image obtained by up-converting the first 2K image having the resolution of 2K by performing up conversion using pixels of the up-conversion line from the vertical developing unit 22, and supplies the first 4K image to the scan changing unit 24.

The up-converting unit $23_2$ generates a second 4K image having the resolution of 4K as a second up-converted image obtained by up-converting the second 2K image having the resolution of 2K by performing up conversion using pixels of the up-conversion line from the vertical developing unit 22, and supplies the second 4K image to the scan changing unit 24.

Further, the up-converting method of the up-converting units $23_1$ and $23_2$ is not particularly limited, and an arbitrary method may be employed.

The scan changing unit 24 functions as a generating unit that generates an output image (a 4K output image) having the resolution of 4K according to the scan method of the display device 13 using the first 4K image received from the up-converting unit $23_1$ and the second 4K image received from the up-converting unit $23_2$, and supplies the 4K output image to the display device 13.

The control unit 25 controls the respective components configuring the image processing unit 12 as necessary.

In the television having the above-described configuration, the image acquiring unit 11 acquires the 2K input image and supplies the 2K input image to the image processing unit 12. The image processing unit 12 performs the resolution conversion of the 2K input image received from the image acquiring unit 11, and supplies the 4K output image obtained by the resolution conversion to the display device 13.

The display device 13 displays the 4K output image received from the image processing unit 12 according to a certain scan method.

<Scan Method>

Figure 2:
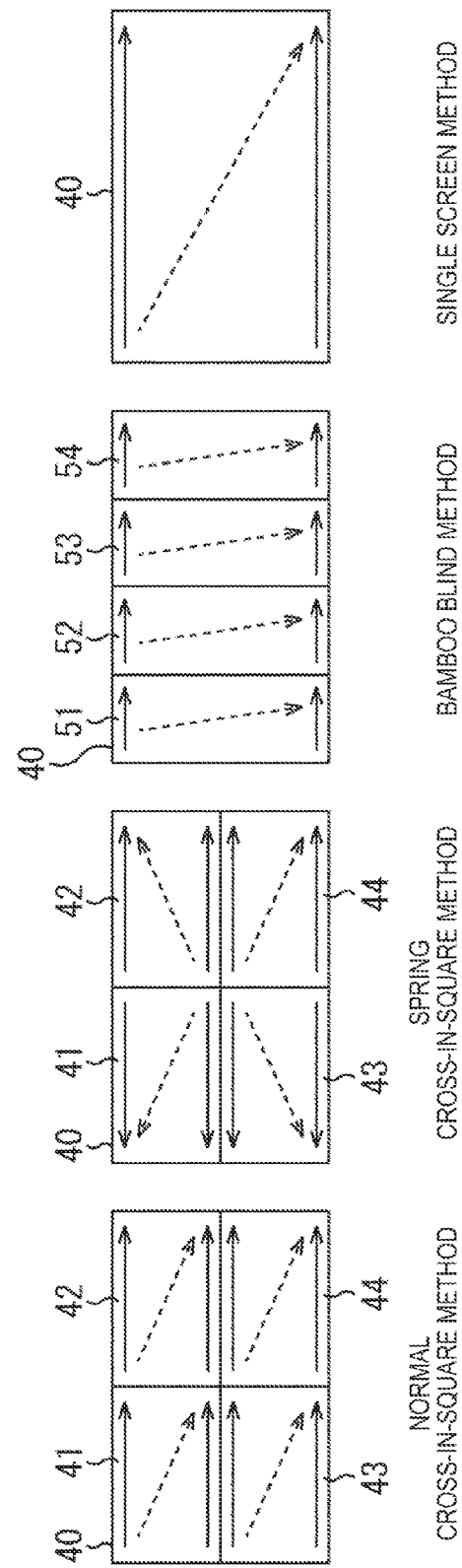
FIG. 2 is a diagram for describing a scan method that can be employed by a display device 13.

FIG. 2 is a diagram for describing an exemplary scan method that can be employed by the display device 13 of FIG. 1.

As described above, as the scan method of the display device 13, for example, the normal cross-in-square method, the spring cross-in-square method, the bamboo blind method, the single screen method, or the like may be employed.

In the normal cross-in-square method and the spring cross-in-square method, a display screen 40 of the display device 13 serving as the 4K display device is divided in half in a horizontal direction and a vertical direction, that is, divided into four small display screens 41, 42, 43, and 44.

Here, the small display screens 41, 42, 43, and 44 correspond respectively to an upper left part, an upper right part, a lower left part, and a lower right part of the display screen 40.

In the normal cross-in-square method, the small display screens 41 to 44 are scanned in parallel in a direction from the upper left to the upper right (which is referred to as a "lower right direction scan" as well).

In other words, in the normal cross-in-square method, the small display screens 41 to 44 are scanned in parallel such that in each of the small display screens 41 to 44, pixels of one line are scanned rightward in the horizontal direction starting from an upper left pixel, and when the rightmost pixel is scanned, pixels of a line one step lower in the vertical direction are similarly scanned rightward.

In the spring cross-in-square method, the small display screens 41 to 44 are scanned in parallel such that scanning is performed in directions toward four corners from the center of the display screen 40 as if an image were springing from the center the display screen 40.

In other words, in the spring cross-in-square method, an upper left direction scan by which pixels of one line are scanned leftward in the horizontal direction starting from a lower right pixel, and when the leftmost pixel is scanned, pixels of a line one step higher in the vertical direction are similarly scanned leftward is performed on the upper left small display screen 41.

An upper right direction scan by which pixels of one line are scanned rightward in the horizontal direction starting from a lower left pixel, and when the rightmost pixel is scanned, pixels of a line one step higher in the vertical direction are similarly scanned rightward is performed on the upper right small display screen 42.

A lower left direction scan by which pixels of one line are scanned leftward in the horizontal direction starting from an upper right pixel, and when the leftmost pixel is scanned, pixels of a line one step lower in the vertical direction are similarly scanned leftward is performed on the lower left small display screen 43.

A lower right direction scan is performed on the lower right small display screen 44. In other words, pixels of one line are scanned rightward in the horizontal direction starting from an upper left pixel, and when the rightmost pixel is scanned, pixels of a line one step lower in the vertical direction are similarly scanned rightward.

In the bamboo blind method, the display screen 40 of the display device 13 serving as the 4K display device is divided into quarters in the horizontal direction, that is, four small display screens 51, 52, 53, and 54.

Here, the small display screens 51, 52, 53, and 54 correspond to first to fourth parts of the display screen 40 from the left.

In the bamboo blind method, the lower right direction scan is performed on each of the small display screens 51 to 54 from the upper left to the lower right.

In other words, in the bamboo blind method, the small display screens 51 to 54 are scanned in parallel such that in each of the small display screens 51 to 54, pixels of one line are scanned rightward in the horizontal direction starting from the upper left pixel, and when the rightmost pixel is scanned, pixels of a line one step lower in the vertical direction are similarly scanned rightward.

In the single screen method, the lower right direction scan is performed on the display screen 40 without dividing the display screen 40.

In other words, in the single screen method, pixels of one line are scanned rightward in the horizontal direction starting from an upper left pixel on the display screen 40, and when the rightmost pixel is scanned, pixels of a line one step lower in the vertical direction are similarly scanned rightward.

Further, in the single screen method, one transmission path is necessary to transmit an image to the display device 13, but in the scan methods other than the single screen method, four transmission paths are necessary. Here, in the scan methods other than the single screen method, a transmission band of one transmission path is smaller than in the single screen method.

Generally, when the scan method of the display device 13 is different, it is necessary to prepare a device having a configuration according to the scan method of the display device 13 as a resolution converting device that performs the resolution conversion of the 2K input image.

However, since a separate resolution converting device is prepared according to the scan method of the display device 13, the cost increases.

In this regard, the image processing unit 12 of FIG. 1 is configured to perform resolution conversion for obtaining a 4K output image corresponding to the scan method of the display device 13 regardless of the scan method of the display device 13.

Next, the resolution conversion of the image processing unit 12 when the 2K input image is a 2D image will be described.

<Resolution Conversion when 2K Input Image is 2D Image>

FIGS. 3A to 3C are diagrams for describing processing of the frame memory unit 21 (FIG. 1) when the 2K input image is a 2D image.

FIG. 3A is a diagram for describing processing of the frame memory unit 21 when the scan method of the display device 13 (FIG. 1) is the normal cross-in-square method.

When the scan method of the display device 13 is the normal cross-in-square method, the frame memory unit 21 stores frames of the 2K input image received from the image acquiring unit 11.

Then, the frame memory unit 21 reads (pixel values of) pixels of the upper half as some frames of the 2K input image according to the sequence of the lower right direction scan, and supplies the read pixels to the vertical developing unit 22 as the first 2K image.

Further, the frame memory unit 21 reads (pixel values of) pixels of the upper half as the remaining frames of the 2K input image according to the sequence of the lower right direction scan similarly to when the pixels of the upper half are read, and supplies the read pixels to the vertical developing unit 22 as the second 2K image.

As a matter of implementation, in order to generate pixels of lines of the central part of the 4K output image by up conversion in the up-converting unit $23_i$ at the subsequent stage, reading of the first 2K image and reading of the second 2K image from (frames of) the 2K input image in the frame memory unit 21 are performed to overlap on the lines of the central part of the 4K output image.

In other words, the frame memory unit 21 reads pixels of several lines beneath the upper half as well as pixels of the upper half of (frames of) the 2K input image as the first 2K image. Similarly, the frame memory unit 21 reads pixels of several lines just above the lower half as well as pixels of the lower half of (frames of) the 2K input image as the second 2K image.

FIG. 3B is a diagram for describing processing of the frame memory unit 21 when the scan method of the display device 13 is the spring cross-in-square method.

When the scan method of the display device 13 is the spring cross-in-square method, the frame memory unit 21 stores frames of the 2K input image received from the image acquiring unit 11.

Then, the frame memory unit 21 reads pixels of the upper half as some frames of the 2K input image according to the sequence of the upper right direction scan, and supplies the read pixels to the vertical developing unit 22 as the first 2K image.

Further, the frame memory unit 21 reads pixels of the lower half as the remaining frames of the 2K input image according to the sequence of the lower right direction scan unlike when pixels of the upper half are read, and supplies the read pixels to the vertical developing unit 22 as the second 2K image.

Further, when the scan method of the display device 13 is the spring cross-in-square method, as a matter of implementation, in order to generate pixels of lines of the central part of the 2K input image by up conversion in the up-converting unit $23_i$ at the subsequent stage, reading of the first 2K image and reading of the second 2K image from the 2K input image in the frame memory unit 21 are performed to overlap on the lines of the central part of the 2K input image, similarly to when the scan method of the display device 13 is the normal cross-in-square method.

FIG. 3C is a diagram for describing processing of the frame memory unit 21 when the scan method of the display device 13 is the single screen method or the bamboo blind method.

When the scan method of the display device 13 is the single screen method or the bamboo blind method, the frame memory unit 21 stores frames of the 2K input image received from the image acquiring unit 11.

Then, the frame memory unit 21 reads pixels of odd-numbered lines as some frames of the 2K input image according to the sequence of the lower right direction scan, and supplies the read pixels to the vertical developing unit 22 as the first 2K image.

Further, the frame memory unit 21 reads pixels of even-numbered lines as the remaining frames of the 2K input image according to the sequence of the lower right direction scan, similarly to when pixels of odd-numbered lines are read, and supplies the read pixels to the vertical developing unit 22 as the second 2K image.

Further, when the scan method of the display device 13 is the single screen method or the bamboo blind method, since the display screen 40 of the display device 13 is not divided in the vertical direction unlike the normal cross-in-square method or the spring cross-in-square method, it is unnecessary to read lines of the central part of the 2K input image in the overlapping manner when the first 2K image and the second 2K image are read from the 2K input image.

Figure 4:
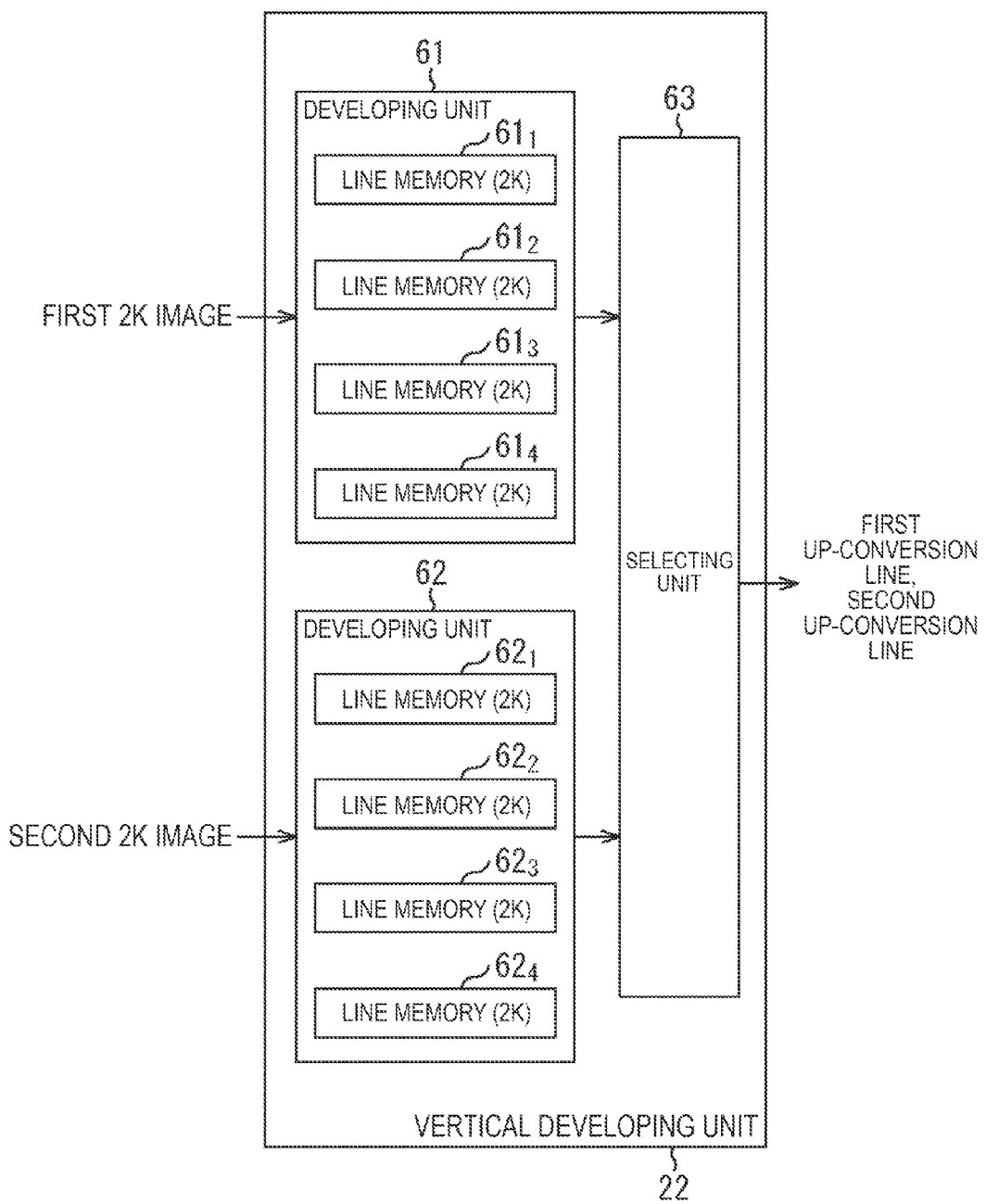
FIG. 4 is a block diagram illustrating an exemplary configuration of a vertical developing unit 22.

FIG. 4 is a block diagram illustrating an exemplary configuration of the vertical developing unit 22 of FIG. 1.

The vertical developing unit 22 includes developing units 61 and 62 and a selecting unit 63.

The developing unit 61 is supplied with (pixels of) the first 2K image from the frame memory unit 21 (FIG. 1).

The developing unit 61 includes a plurality of line memories, for example, four line memories $61_1$, $61_2$, $61_3$, and $61_4$.

The line memory $61_j$ has the memory capacity corresponding to one line of the 2K image, and stores pixels of one line of the first 2K image received from the frame memory unit 21.

In the developing unit 61, pixels of four consecutive lines of the first 2K image received from the frame memory unit 21 are stored in the four line memories $61_1$ to $61_4$ in the order in which the pixels are supplied from the frame memory unit 21. Then, the developing unit 61 reads the pixels of the four consecutive lines of the first 2K image stored in the line memory $61_1$ to $61_4$ in parallel in the form in which the pixels are developed in the vertical direction, and supplies the read pixels to the selecting unit 63.

The developing unit 62 is supplied with (pixels of) the second 2K image from the frame memory unit 21.

The developing unit 62 includes a plurality of line memories, for example, four line memories $62_1$, $62_2$, $62_3$, and $62_4$.

The line memory $62_j$ has the memory capacity corresponding to one line of the 2K image, and stores pixels of one line of the second 2K image received from the frame memory unit 21.

In the developing unit 62, pixels of four consecutive lines of the second 2K image received from the frame memory unit 21 are stored in the four line memories $62_1$ to $62_4$ in the order in which the pixels are supplied from the frame memory unit 21. Then, the developing unit 62 reads the pixels of the four consecutive lines of the second 2K image stored in the line memory $62_1$ to $62_4$ in parallel in the form in which the pixels are developed in the vertical direction, and supplies the read pixels to the selecting unit 63.

The selecting unit 63 selects a first up-conversion line that is an up-conversion line used for up conversion for generating the first 4K image from one or both of the four (consecutive) lines of the first 2K image received from the developing unit 61 and the four (consecutive) lines of the second 2K image received from the developing unit 62, and supplies the selected first up-conversion line to the up-converting unit $23_1$ (FIG. 1).

The selecting unit 63 selects a second up-conversion line that is an up-conversion line used for up conversion for generating the second 4K image from the other or both of the four lines of the first 2K image received from the developing unit 61 and the four lines of the second 2K image received from the developing unit 62, and supplies the selected second up-conversion line to the up-converting unit $23_2$ (FIG. 1).

In the present embodiment, the up-converting unit $23_i$ is assumed to generate pixels of one lines of the 4K output image using pixels of four lines of the 2K input image, and thus the developing unit 61 includes the four line memories $61_1$ to $61_4$.

Thus, the number of the line memories $61_j$ configuring the developing unit 61 is different from the number of lines of pixels of the 2K input image that is used to generate pixels of one lines of the 4K output image in the up-converting unit $23_i$.

In other words, the number of lines of pixels of the 2K input image used to generate pixels of one lines of the 4K output image in the up-converting unit $23_i$ is not limited to four, and the line memories $61_j$ that are equal to the number of lines are disposed in the developing unit 61. This is similarly applied to the developing unit 62.

Figure 5:
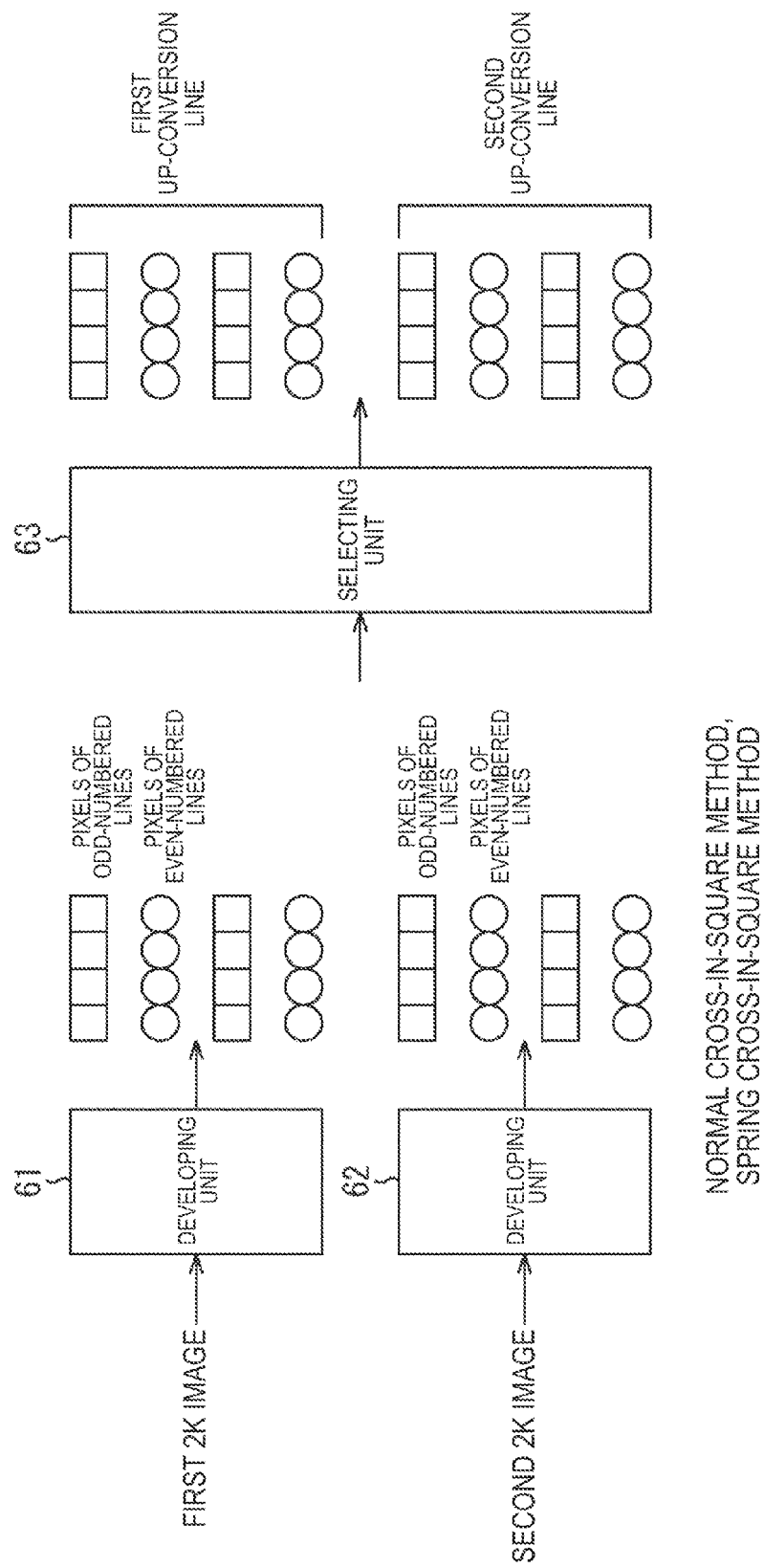
FIG. 5 is a diagram for describing processing of the vertical developing unit 22 when a scan method of the display device 13 is a normal cross-in-square method or a spring cross-in-square method.

FIG. 5 is a diagram for describing processing of the vertical developing unit 22 (FIG. 4) when the scan method of the display device 13 (FIG. 1) is the normal cross-in-square method or the spring cross-in-square method.

When the scan method of the display device 13 is the normal cross-in-square method or the spring cross-in-square method, the upper half of (frames of) the 2K input image is supplied from the frame memory unit 21 to the vertical developing unit 22 as the first 2K image, and the lower half of the 2K input image is supplied as the second 2K image.

In the developing unit 61 of the vertical developing unit 22, four consecutive lines of the upper half of the 2K input image serving as the first 2K image are stored, read, and supplied to the selecting unit 63.

Further, in the developing unit 62 of the vertical developing unit 22, four consecutive lines of the lower half of the 2K input image serving as the second 2K image are stored, read, and supplied to the selecting unit 63.

The selecting unit 63 selects the four lines of the upper half of the 2K input image received from the developing unit 61 as the first up-conversion line without any change, and supplies the first up-conversion line to the up-converting unit $23_1$.

Further, the selecting unit 63 selects the four lines of lower half of the 2K input image received from the developing unit 62 as the second up-conversion line without any change, and supplies the second up-conversion line to the up-converting unit $23_2$.

Here, the up-converting unit $23_1$ generates pixels of lines (for example, lines of the 4K output image at the position near a horizontal line equally dividing the four lines serving as the first up-conversion line) of the upper half of the 4K output image corresponding to the positions of the four lines using the pixels of four lines of the upper half of the 2K input image serving as the first up-conversion line received from the selecting unit 63, and supplies the generated pixels to the scan changing unit 24 as the first 4K image.

Further, the up-converting unit $23_2$ generates pixels of lines of the lower half of the 4K output image corresponding to four lines using pixels of four lines of the lower half of the 2K input image serving as the second up-conversion line received from the selecting unit 63, and supplies the second 4K image to the scan changing unit 24.

Thus, when the scan method of the display device 13 is the normal cross-in-square method or the spring cross-in-square method, the first 4K image corresponds to the portion (region) of the upper half of (frames of) the 4K output image, and the second 4K image corresponds to the portion of the lower half of the 4K output image.

Figure 6:
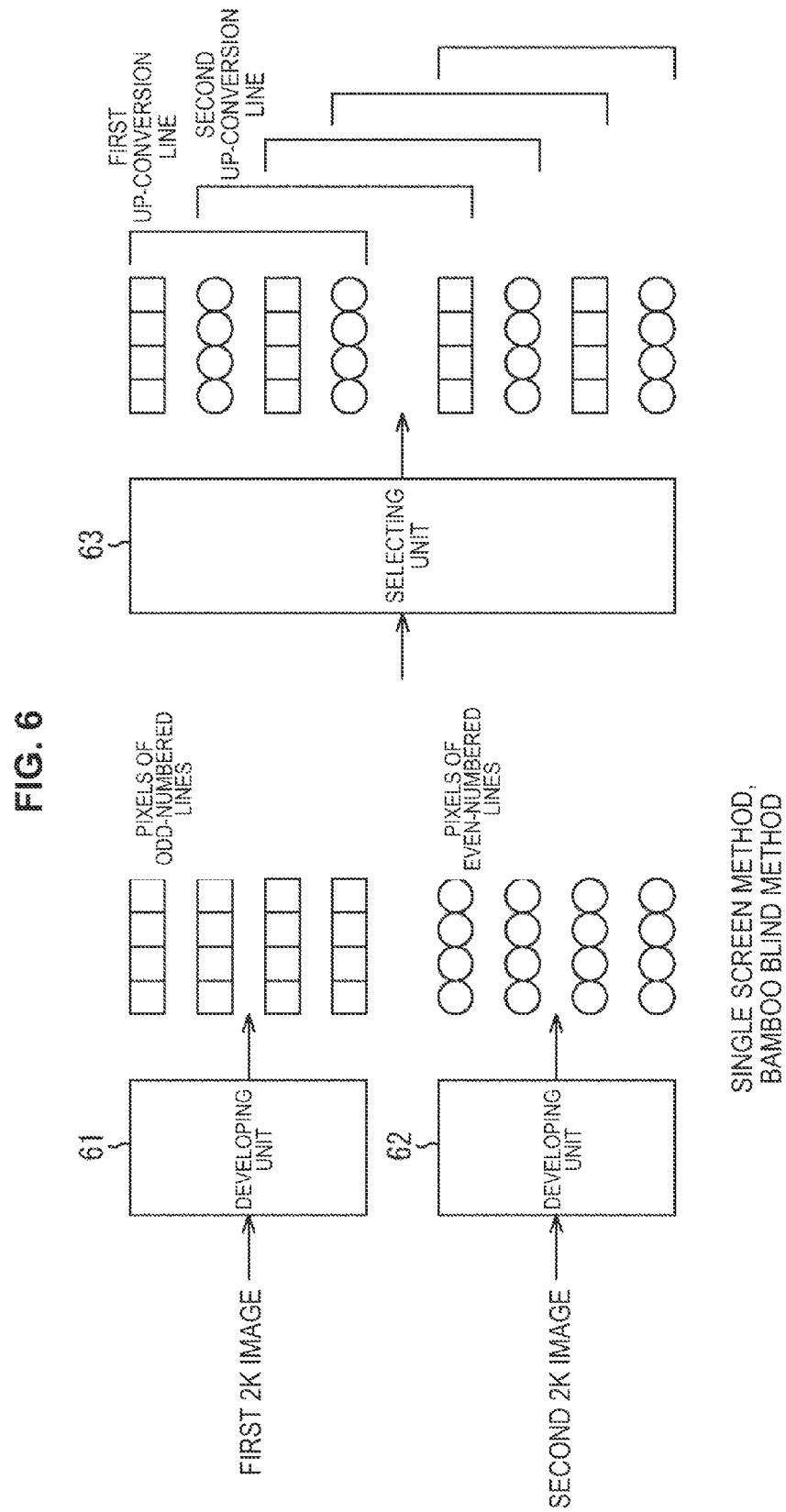
FIG. 6 is a diagram for describing processing of the vertical developing unit 22 when a scan method of the display device 13 is a single screen method or a bamboo blind method.

FIG. 6 is a diagram for describing processing of the vertical developing unit 22 (FIG. 4) when the scan method of the display device 13 (FIG. 1) is the single screen method or the bamboo blind method.

When the scan method of the display device 13 is the single screen method or the bamboo blind method, odd-numbered lines of (frames of) the 2K input image are supplied from the vertical developing unit 22 to the frame memory unit 21 as the first 2K image, and even-numbered lines of the 2K input image are supplied from the vertical developing unit 22 to the frame memory unit 21 as the second 2K image.

In the developing unit 61 of the vertical developing unit 22, four consecutive odd-numbered lines of the 2K input image serving as the first 2K image are stored, read, and supplied to the selecting unit 63.

Further, in the developing unit 62 of the vertical developing unit 22, four consecutive even-numbered lines of the 2K input image serving as the second 2K image are stored, read, and supplied to the selecting unit 63.

Each of the four odd-numbered lines supplied from the developing unit 61 to the selecting unit 63 and each of the four even-numbered lines supplied from the developing unit 62 to the selecting unit 63 are lines adjacent to each other in the original 2K input image.

The selecting unit 63 alternately arranges the four odd-numbered lines of the 2K input image supplied from the developing unit 61 and the four even-numbered lines of the 2K input image supplied from the developing unit 6, mixes lines merging in the form of a comb, and reconstructs eight lines of the original 2K input image.

Then, the selecting unit 63 selects four consecutive lines used to generate pixels of odd-numbered lines corresponding to the positions of pixels of odd-numbered lines of the 4K output image among eight lines of the original 2K input image as the first up-conversion line, and supplies the first up-conversion line to the up-converting unit $23_1$.

Further, the selecting unit 63 selects four consecutive lines used to generate pixels of even-numbered lines corresponding to the positions of pixels of even-numbered lines of the 4K output image among eight lines of the original 2K input image as the second up-conversion line, and supplies the second up-conversion line to the up-converting unit $23_1$.

Here, the up-converting unit $23_1$ generates pixels of odd-numbered lines of the 4K output image corresponding to the positions of the four lines using the pixels of the four lines of the 2K input image serving as the first up-conversion line supplied from the selecting unit 63, and supplies the generated pixels to the scan changing unit 24 as the first 4K image.

Further, the up-converting unit $23_2$ generates pixels of even-numbered lines of the 4K output image corresponding to the positions of the four lines using the pixels of the four lines of the 2K input image serving as the second up-conversion line supplied from the selecting unit 63, and supplies the generated pixels to the scan changing unit 24 as the second 4K image.

Thus, when the scan method of the display device 13 is the single screen method or the bamboo blind method, the first 4K image corresponds to the odd-numbered lines of (frames of) the 4K output image, and the second 4K image corresponds to the even-numbered lines of the 4K output image.

Further, the order in which the pixels of the first 4K image are supplied from the up-converting unit $23_1$ to the scan changing unit 24 matches the order in which the pixels serving as the first 2K image are read from the frame memory unit 21 described above with reference to FIG. 3.

Similarly, the order in which the pixels of the first 4K image are supplied from the up-converting unit $23_2$ to the scan changing unit 24 matches the order in which the pixels serving as the second 2K image are read from the frame memory unit 21 described above with reference to FIG. 3.

Thus, when the scan method of the display device 13 is the normal cross-in-square method, the single screen method, or the bamboo blind method, the pixels of the first 4K image are supplied from the up-converting unit $23_1$ to the scan changing unit 24 according to the sequence of the lower right direction scan.

Further, when the scan method of the display device 13 is the spring cross-in-square method, the pixels of the first 4K image are supplied from the up-converting unit $23_1$ to the scan changing unit 24 according to the sequence of the upper right direction scan.

Meanwhile, the supply of the pixels of the second 4K image from the up-converting unit $23_2$ to the scan changing unit 24 is performed according to the sequence of the lower right direction scan (regardless of the scan method of the display device 13).

Figure 7:
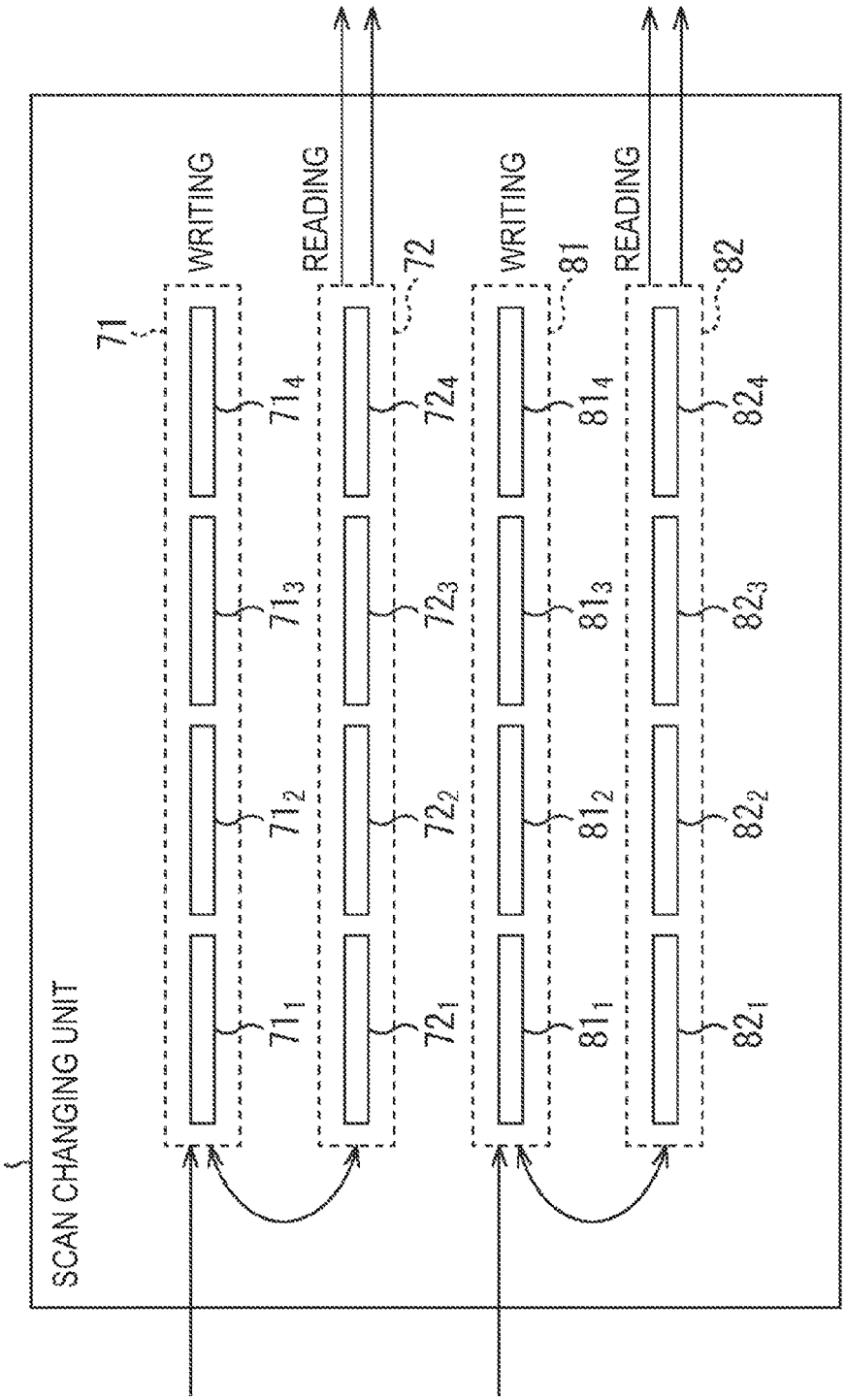
FIG. 7 is a block diagram illustrating an exemplary configuration of a scan changing unit 24.

FIG. 7 is a block diagram illustrating an exemplary configuration of the scan changing unit 24 of FIG. 1.

The scan changing unit 24 includes a plurality of memory blocks each of which includes a plurality of line memories. The scan changing unit 24 performs reading and writing of the first 4K image received from the up-converting unit $23_1$ and the second 4K image received from the up-converting unit $23_2$ on the memory blocks, generates the 4K output image supported by the scan method of the display device 13, and supplies the generated 4K output image to the display device 13.

In other words, referring to FIG. 7, the scan changing unit 24 includes four memory blocks, that is, memory blocks 71 and 72 and memory blocks 81 and 82.

The memory block 71 includes four line memories $71_1$, $71_2$, $71_3$, and $71_4$, and the memory block 72 includes four line memories $72_1$, $72_2$, $72_3$, and $72_4$.

The memory block 81 includes four line memories $81_1$, $81_2$, $81_3$, and $81_4$, and the memory block 82 includes four line memories $82_1$, $82_2$, $82_3$, and $82_4$.

The line memory $71_1$ has the memory capacity capable of storing a ¼ line of the 4K output image. The remaining line memories $71_2$ to $71_4$, $72_1$ to $72_4$, $81_1$ to $81_4$, and $82_1$ to $82_4$ are similar as well.

The memory block 71 writes one line of the first 4K image supplied from the scan changing unit 24 in the line memory $71_1$ to $71_4$, and reads one line of the first 4K image in a certain order decided according to the scan method of the display device 13 (FIG. 1).

Similarly, the memory block 72 sequentially writes one line of the first 4K image supplied from the scan changing unit 24 in the line memory $72_1$ to $72_4$, and reads one line of the first 4K image in a certain order decided according to the scan method of the display device 13.

The memory block 81 sequentially writes one line of the second 4K image supplied from the scan changing unit 24 in the line memory $81_1$ to $81_4$, and reads one line of the second 4K image in a certain order decided according to the scan method of the display device 13.

Similarly, the memory block 82 writes one line of the second 4K image supplied from the scan changing unit 24 in the line memory $82_1$ to $82_4$, and reads one line of the second 4K image in a certain order decided according to the scan method of the display device 13.

In the memory block 71 and the memory block 72, when writing is performed on one of the memory block 71 and 72, reading is performed on the other.

In other words, in the memory block 71 and the memory block 72, when a certain one line of the first 4K image supplied from the scan changing unit 24 is written in one of the memory blocks 71 and 72, one line of the first 4K image that is previously written is read from the other.

Similarly, in the memory block 81 and the memory block 82, when writing is performed on one of the memory blocks 81 and 82, reading is performed on the other.

The reading and writing process on the four memory blocks 71, 72, 81, and 82 of the scan changing unit 24 will be described with reference to FIGS. 8, 9, 10, and 11.

In FIG. 8 to FIG. 11, the scan changing unit 24 is assumed to be in the state in which writing is performed on the memory blocks 71 and 81, and reading is performed on the memory blocks 72 and 82.

As illustrated in FIGS. 8 to 11, regardless of the scan method of the display device 13, the memory block 71 sequentially writes one line of the first 4K image supplied from the scan changing unit 24 in the line memories $71_1$ to $71_4$ in the supplied order (the order of the line memories $71_1$, $71_2$, $71_3$, and $71_4$).

Similarly, regardless of the scan method of the display device 13, the memory block 81 sequentially writes one line of the second 4K image supplied from the scan changing unit 24 in the line memories $81_1$ to $81_4$ in the supplied order.

Meanwhile, pixels of one line (of the 4K image) written in the memory blocks 72 and 82 are read in a certain order decided according to the scan method of the display device 13.

Figure 8:
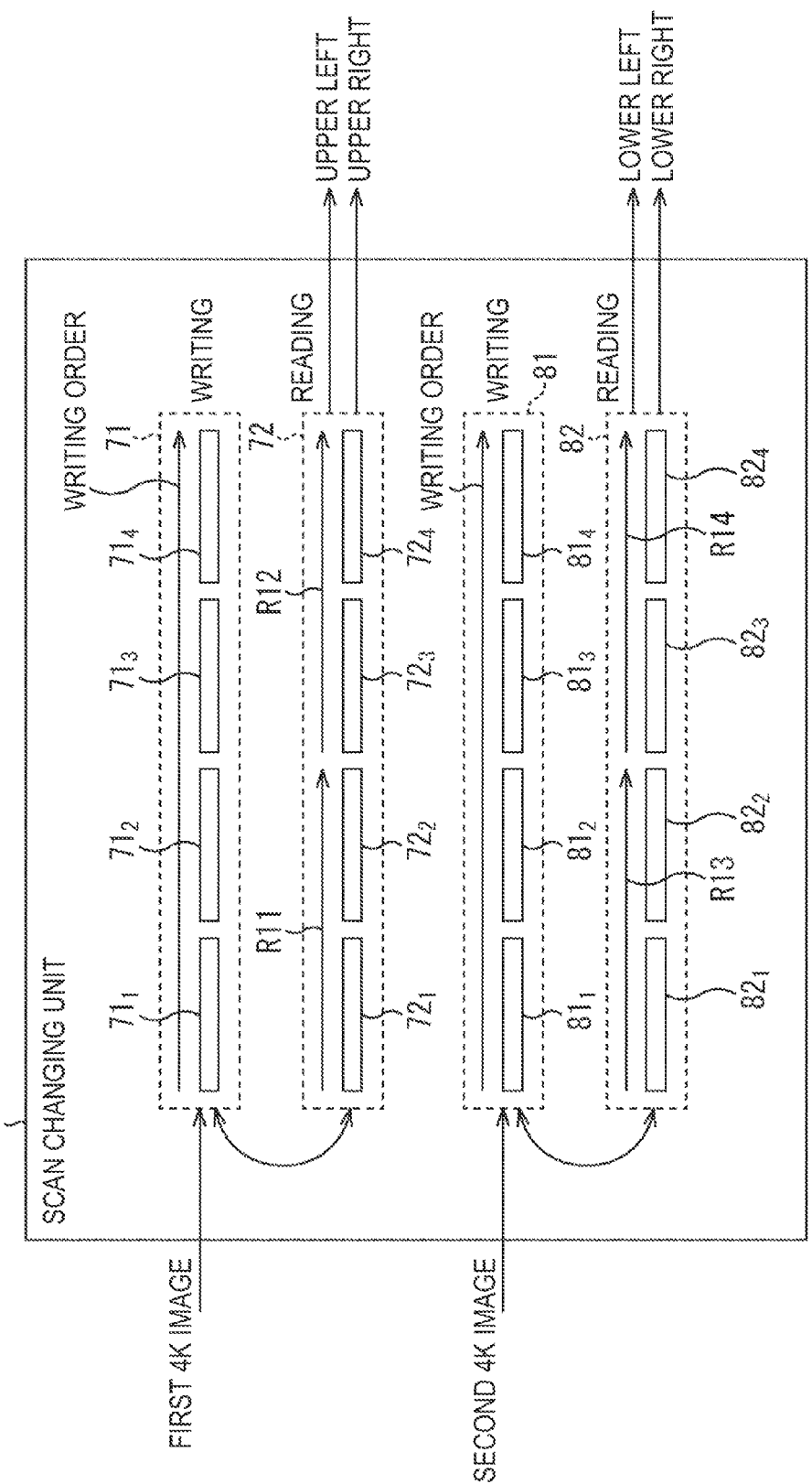
FIG. 8 is a diagram for describing a reading and writing process of the scan changing unit 24 on four memory blocks 71, 72, 81, and 82.

FIG. 8 is a diagram illustrating a sequence of reading pixels of one line from the memory blocks 72 and 82 when the scan method of the display device 13 is the normal cross-in-square method.

When the scan method of the display device 13 is the normal cross-in-square method, (pixel values of) two pixels of the first 4K image are read from the memory block 72 in parallel as indicated by arrows R11 and R12.

In other words, in the memory block 72, pixels of a ½ line of the first 4K image are sequentially read from the line memories $72_1$ and $72_2$ in the same order as the writing order as indicated by the arrow R11.

At the same time, in the memory block 72, pixels of a ½ line of the first 4K image are sequentially read from the line memories $72_3$ and $72_4$ in the same order as the writing order as indicated by the arrow R12.

Meanwhile, two pixels of the second 4K image are read from the memory block 82 in parallel as indicated by arrows R13 and R14.

In other words, in the memory block 82, pixels of a ½ line of the second 4K image are sequentially read from the line memories $82_1$ and $82_2$ in the same order as the writing order as indicated by the arrow R13.

At the same time, in the memory block 82, pixels of a ½ line of the second 4K image are sequentially read from the line memories $82_3$ and $82_4$ in the same order as the writing order as indicated by the arrow R14.

Here, when the scan method of the display device 13 is the normal cross-in-square method, the first 4K image corresponds to the upper half of (frames of) the 4K output image, and the second 4K image corresponds to the lower half of the 4K output image as described above with reference to FIG. 5.

An image (the left half of the first 4K image) configured with the pixels of the first 4K image sequentially read from the memory block 72 in the order indicated by the arrow R11 is supplied to the display device 13 as a ¼ portion that is the upper left portion of the 4K output image (an upper left portion when the 4K output image is equally divided in the horizontal direction and the vertical direction).

In the display device 13, the image configured with the pixels of the first 4K image sequentially read from the memory block 72 in the order indicated by the arrow R11 is displayed on the small display screen 41 (FIG. 2) which is the upper left portion of the display screen 40 according to the lower right direction scan.

An image (the right half of the first 4K image) configured with the pixels of the first 4K image sequentially read from the memory block 72 in the order indicated by the arrow R12 is supplied to the display device 13 as a ¼ portion that is the upper right portion of the 4K output image.

In the display device 13, the image configured with the pixels of the first 4K image sequentially read from the memory block 72 in the order indicated by the arrow R12 is displayed on the small display screen 42 (FIG. 2) which is the upper right portion of the display screen 40 according to the lower right direction scan.

An image (the left half of the second 4K image) configured with the pixels of the second 4K image sequentially read from the memory block 82 in the order indicated by the arrow R13 is supplied to the display device 13 as a ¼ portion that is the lower left portion of the 4K output image.

In the display device 13, the image configured with the pixels of the second 4K image sequentially read from the memory block 82 in the order indicated by the arrow R13 is displayed on the small display screen 43 (FIG. 2) which is the lower left portion of the display screen 40 according to the lower right direction scan.

An image (the right half of the first 4K image) configured with the pixels of the second 4K image sequentially read from the memory block 82 in the order indicated by the arrow R14 is supplied to the display device 13 as a ¼ portion that is the lower right portion of the 4K output image.

In the display device 13, the image configured with the pixels of the second 4K image sequentially read from the memory block 82 in the order indicated by the arrow R14 is displayed on the small display screen 44 (FIG. 2) which is the lower right portion of the display screen 40 according to the lower right direction scan.

As a result, the display device 13 displays the 4K output image according to the normal cross-in-square method.

Figure 9:
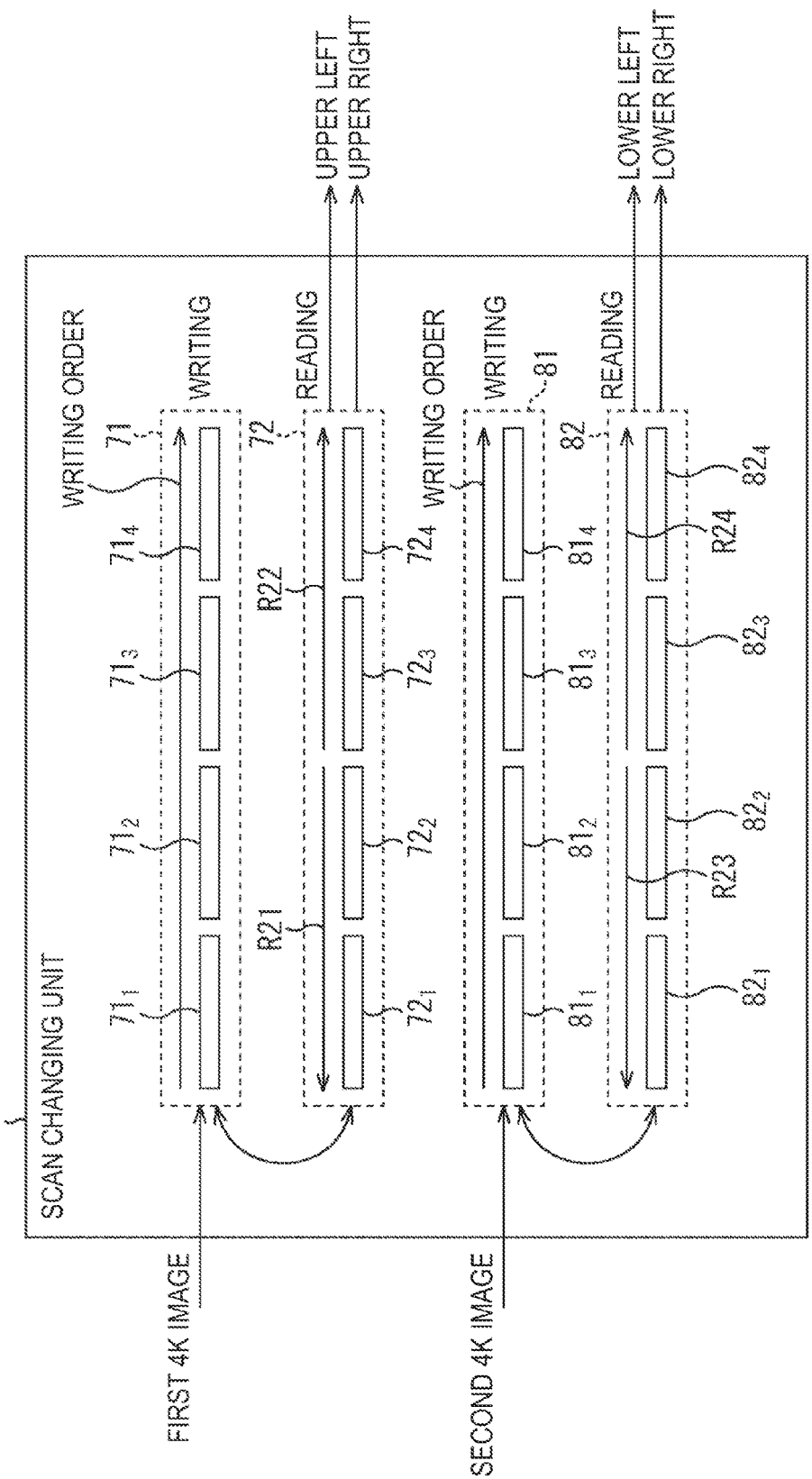
FIG. 9 is a diagram for describing a reading and writing process of the scan changing unit 24 on four memory blocks 71, 72, 81, and 82.

FIG. 9 is a diagram illustrating a sequence of reading pixels of one line from the memory blocks 72 and 82 when the scan method of the display device 13 is the spring cross-in-square method.

When the scan method of the display device 13 is the spring cross-in-square method, two pixels of the first 4K image are read from the memory block 72 in parallel as indicated by arrows R21 and R22.

In other words, in the memory block 72, pixels of a ½ line of the first 4K image are sequentially read from the line memories $72_1$ and $72_2$ in the reverse order to the writing order as indicated by the arrow R21.

At the same time, in the memory block 72, pixels of a ½ line of the first 4K image are sequentially read from the line memory $72_3$ and $72_4$ in the same order as the writing order as indicated by the arrow R22.

Meanwhile, two pixels of the second 4K image are read from the memory block 82 in parallel as indicated by arrows R23 and R24.

In other words, in the memory block 82, pixels of a ½ line of the second 4K image are sequentially read from the line memories $82_1$ and $82_2$ in the reverse order to the writing order as indicated by the arrow R23.

At the same time, in the memory block 82, pixels of a ½ line of the second 4K image are sequentially read from the line memory $82_3$ and $82_4$ in the same order as the writing order as indicated by the arrow R24.

Here, when the scan method of the display device 13 is the spring cross-in-square method, the first 4K image corresponds to the upper half of (frames of) the 4K output image, and the second 4K image corresponds to the lower half of the 4K output image.

An image (the left half of the first 4K image) configured with the pixels of the first 4K image sequentially read from the memory block 72 in the order indicated by the arrow R21 is supplied to the display device 13 as a ¼ portion that is the upper left portion of the 4K output image.

In the display device 13, the image configured with the pixels of the first 4K image sequentially read from the memory block 72 in the order indicated by the arrow R21 is displayed on the small display screen 41 (FIG. 2) which is the upper left portion of the display screen 40 according to the upper left direction scan.

An image (the right half of the first 4K image) configured with the pixels of the first 4K image sequentially read from the memory block 72 in the order indicated by the arrow R22 is supplied to the display device 13 as a ¼ portion that is the upper right portion of the 4K output image.

In the display device 13, the image configured with the pixels of the first 4K image sequentially read from the memory block 72 in the order indicated by the arrow R22 is displayed on the small display screen 42 (FIG. 2) which is the upper right portion of the display screen 40 according to the upper right direction scan.

An image (the left half of the second 4K image) configured with the pixels of the second 4K image sequentially read from the memory block 82 in the order indicated by the arrow R23 is supplied to the display device 13 as a ¼ portion that is the lower left portion of the 4K output image.

In the display device 13, the image configured with the pixels of the second 4K image sequentially read from the memory block 82 in the order indicated by the arrow R23 is displayed on the small display screen 43 (FIG. 2) which is the lower left portion of the display screen 40 according to the lower left direction scan.

An image (the right half of the first 4K image) configured with the pixels of the second 4K image sequentially read from the memory block 82 in the order indicated by the arrow R24 is supplied to the display device 13 as a ¼ portion that is the lower right portion of the 4K output image.

In the display device 13, the image configured with the pixels of the second 4K image sequentially read from the memory block 82 in the order indicated by the arrow R24 is displayed on the small display screen 44 (FIG. 2) which is the lower right portion of the display screen 40 according to the lower right direction scan.

As a result, the display device 13 displays the 4K output image according to the spring cross-in-square method.

Here, reading in which two pixels of the first 4K image are read from the memory block 72 (and 71) in parallel, and two pixels of the second 4K image are read from the memory block 82 (and 81) in parallel as described above with reference to FIGS. 8 and 9 is hereinafter referred to as "two-divisional reading" as well.

Figure 10:
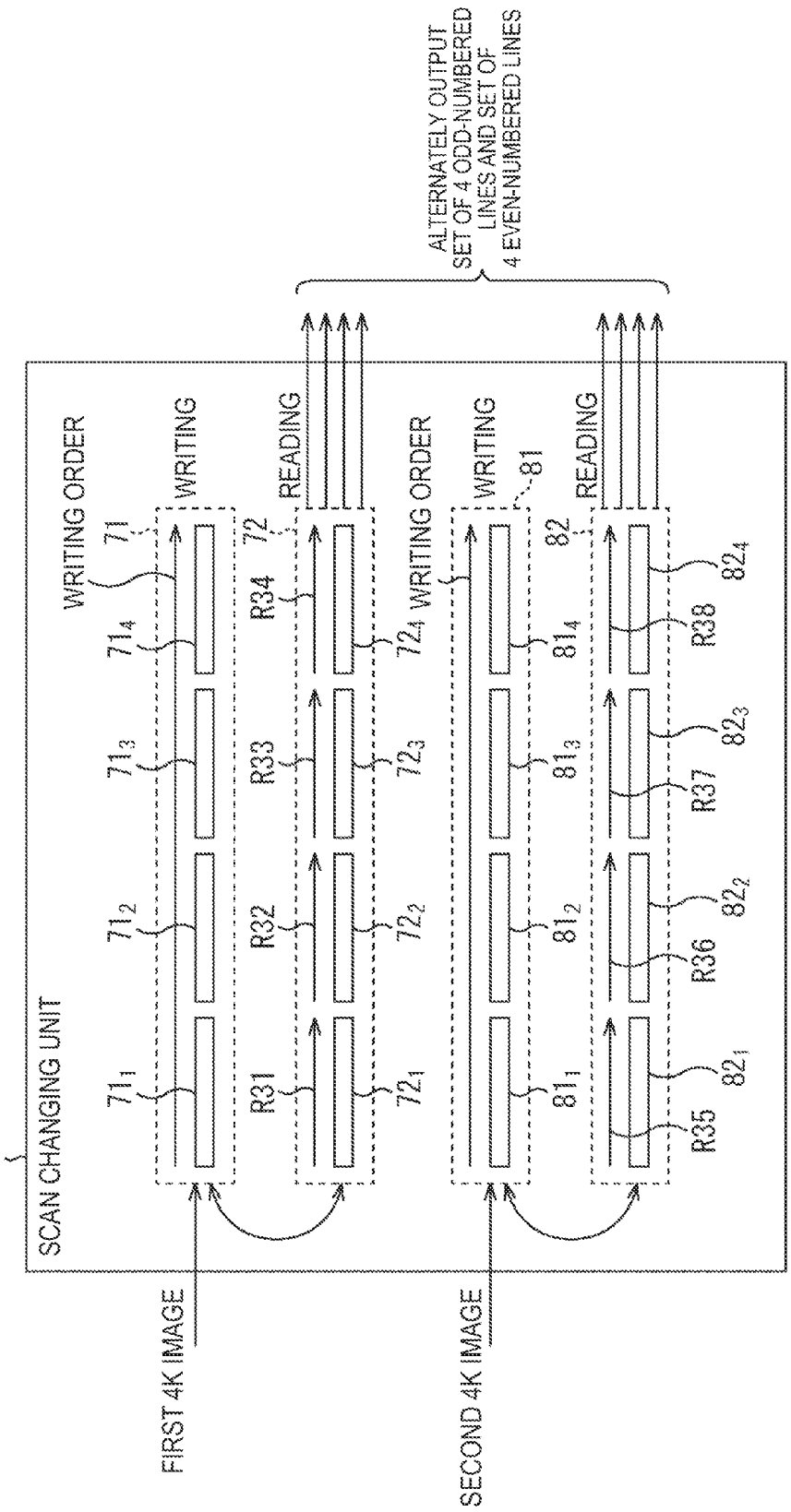
FIG. 10 is a diagram for describing a reading and writing process of the scan changing unit 24 on four memory blocks 71, 72, 81, and 82.

FIG. 10 is a diagram illustrating a sequence of reading pixels of one line from the memory blocks 72 and 82 when the scan method of the display device 13 is the bamboo blind method.

When the scan method of the display device 13 is the bamboo blind method, four pixels of the first 4K image are read from the memory block 72 in parallel as indicated by arrows R31, R32, R33, and R32.

In other words, in the memory block 72, pixels of a ¼ line of the first 4K image are sequentially read from the line memory $72_1$ in the same order as the writing order as indicated by the arrow R31.

At the same time, in the memory block 72, pixels of a ¼ line of the first 4K image are sequentially read from each of the line memories $72_2$ to $72_4$ in the same order as the writing order as indicated by the arrows R32 to 34.

Meanwhile, in the memory block 82, four pixels of the second 4K image are read from the memory block 82 in parallel as indicated by arrows R35, R36, R37, and R38.

In other words, in the memory block 82, pixels of a ¼ line of the second 4K image are sequentially read from the line memory $82_1$ in the same order as the writing order as indicated by the arrow R35.

At the same time, in the memory block 72, pixels of a ¼ line of the second 4K image are sequentially read from each of the line memories $82_2$ to $82_4$ in the same order as the writing order as indicated by the arrows R36 to R38.

Here, when the scan method of the display device 13 is the bamboo blind method, the first 4K image corresponds to the odd-numbered lines of (frames of) the 4K output image, and the second 4K image corresponds to the even-numbered lines of the 4K output image.

The pixels of the ¼ line read from the memory block 72 and the pixels of the ¼ line read from the memory block 82 are supplied to the display device 13 in the corresponding order.

In other words, pixels of first ¼ lines (from the left) of the first 4K image (pixels from the leftmost position to the position of the ¼ line in the first 4K image) read from the memory block 72 in the order indicated by the arrow R31 are supplied to the display device 13 as pixels of first ¼ lines of odd-numbered lines of the 4K output image.

Further, pixels of first ¼ lines of the second 4K image (pixels from the leftmost position to the position of the ¼ line in the second 4K image) read from the memory block 82 in the order indicated by the arrow R35 are supplied to the display device 13 as pixels of first ¼ lines of even-numbered lines of the 4K output image.

In the display device 13, the pixels of the first ¼ line of the first 4K image (pixels from the leftmost position to the position of the ¼ line in the odd-numbered lines of the 4K output image) read from the memory block 72 in the order indicated by the arrow R31 and the pixels of the first ¼ line of the second 4K image (pixels from the leftmost position to the position of the ¼ line in the even-numbered lines of the 4K output image) read from the memory block 82 in the order indicated by the arrow R35 are displayed on the first small display screen 51 (FIG. 2) (from the left) of the display screen 40 in the corresponding order.

Pixels of second ¼ lines of the first 4K image (pixels from the position of the ¼ line to the position of a ½ line in the first 4K image) read from the memory block 72 in the order indicated by the arrow R32 are supplied to the display device 13 as pixels of second ¼ lines of odd-numbered lines of the 4K output image.

Further, pixels of second ¼ lines of the second 4K image (pixels from the position of the ¼ line to the position of the ½ line in the second 4K image) read from the memory block 82 in the order indicated by the arrow R36 are supplied to the display device 13 as pixels of second ¼ lines of even-numbered lines of the 4K output image.

In the display device 13, the pixels of the second ¼ lines of the first 4K image (pixels from the position of the ¼ line to the position of the ½ line in the odd-numbered lines of the 4K output image) read from the memory block 72 in the order indicated by the arrow R32 and the pixels of the second ¼ lines of the second 4K image (pixels from the position of the ¼ line to the position of the ½ line in the even-numbered lines of the 4K output image) read from the memory block 82 in the order indicated by the arrow R36 are displayed on the second small display screen 52 (FIG. 2) of the display screen 40 in the corresponding order.

Pixels of third ¼ lines of the first 4K image (pixels from the position of the ½ line to the position of a ¾ line in the first 4K image) read from the memory block 72 in the order indicated by the arrow R33 are supplied to the display device 13 as pixels of third ¼ lines of odd-numbered lines of the 4K output image.

Further, pixels of third ¼ lines of the second 4K image (pixels from the position of the ½ line to the position of the ¾ line in the second 4K image) read from the memory block 82 in the order indicated by the arrow R37 are supplied to the display device 13 as pixels of third ¼ lines of even-numbered lines of the 4K output image.

In the display device 13, the pixels of the third ¼ lines of the first 4K image (pixels from the position of the ½ line to the position of the ¾ line in the odd-numbered lines of the 4K output image) read from the memory block 72 in the order indicated by the arrow R33 and the pixels of the third ¼ lines of the second 4K image (pixels from the position of the ½ line to the position of the ¾ line in the even-numbered lines of the 4K output image) read from the memory block 82 in the order indicated by the arrow R37 are displayed on the third small display screen 53 (FIG. 2) of the display screen 40 in the corresponding order.

Pixels of fourth ¼ lines of the first 4K image (pixels from the position of the ¾ line to the rightmost position in the first 4K image) read from the memory block 72 in the order indicated by the arrow R34 are supplied to the display device 13 as pixels of fourth ¼ lines of odd-numbered lines of the 4K output image.

Further, pixels of fourth ¼ lines of the second 4K image (pixels from the position of the ¾ line to the rightmost position in the second 4K image) read from the memory block 82 in the order indicated by the arrow R38 are supplied to the display device 13 as pixels of fourth ¼ lines of even-numbered lines of the 4K output image.

In the display device 13, the pixels of the fourth ¼ lines of the first 4K image (pixels from the position of the ¾ line to the rightmost position in the odd-numbered lines of the 4K output image) read from the memory block 72 in the order indicated by the arrow R34 and the pixels of the fourth ¼ lines of the second 4K image (pixels from the position of the ¾ line to the rightmost position in the even-numbered lines of the 4K output image) read from the memory block 82 in the order indicated by the arrow R38 are displayed on the fourth small display screen 54 (FIG. 2) of the display screen 40 in the corresponding order.

As a result, the display device 13 displays the 4K output image according to the bamboo blind method.

Here, reading in which the four pixels of the first 4K image are read from the memory block 72 in parallel, and the four pixels of the second 4K image are read from the memory block 82 in parallel as described above with reference to FIG. 10 is hereinafter referred to as "four-divisional reading" as well.

Figure 11:
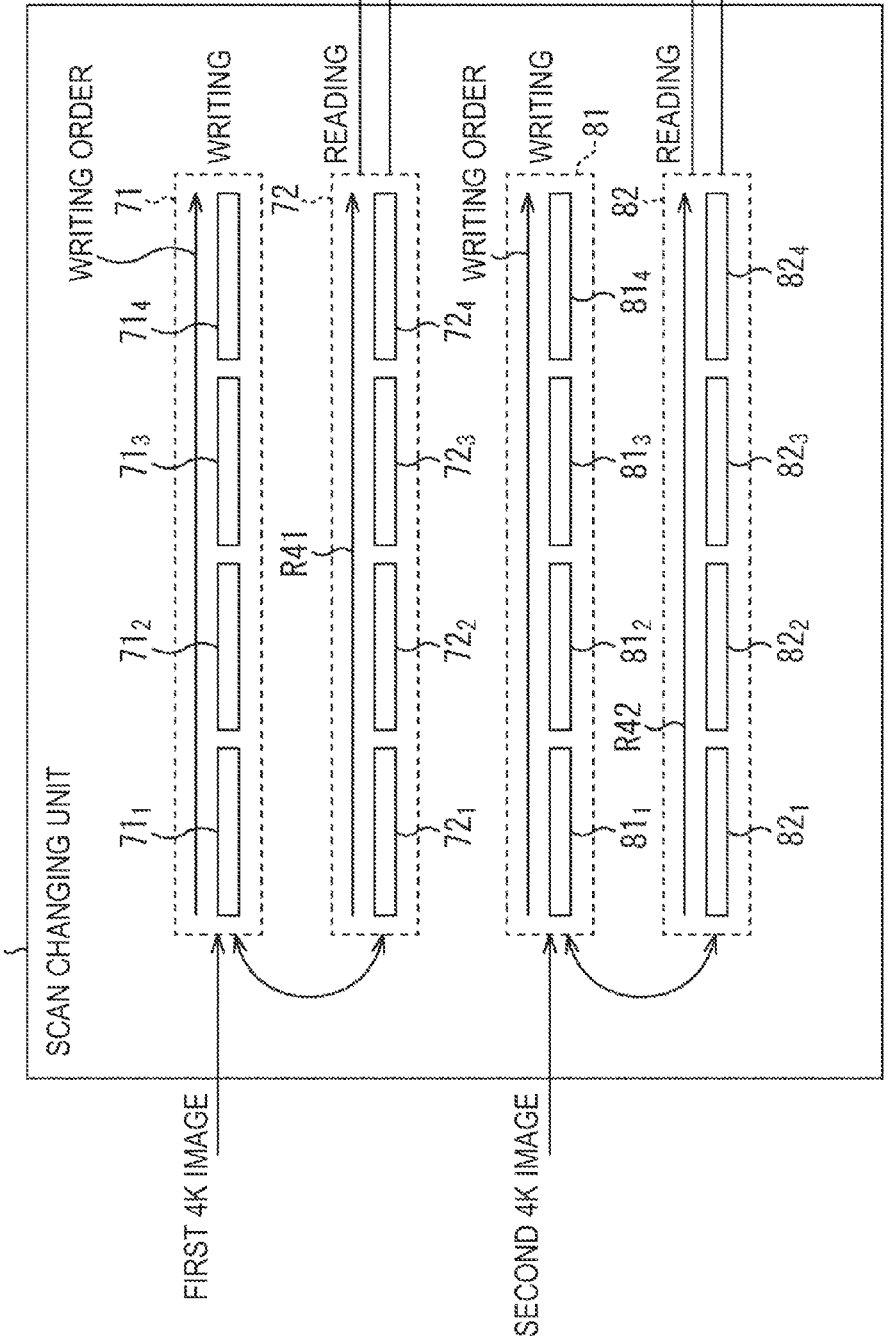
FIG. 11 is a diagram for describing a reading and writing process of the scan changing unit 24 on four memory blocks 71, 72, 81, and 82.

FIG. 11 is a diagram illustrating a sequence of reading pixels of one line from the memory blocks 72 and 82 when the scan method of the display device 13 is the single screen method.

When the scan method of the display device 13 is the single screen method, in the memory block 72, pixels of one line of the first 4K image are sequentially read from the line memories $72_1$ to $72_4$ in the same order as the writing order as indicated by an arrow R41.

At the same time as the reading of the memory block 72, in the memory block 82, pixels of one line of the second 4K image are sequentially read from the line memories $82_1$ to $82_4$ in the same order as the writing order as indicated by an arrow R42.

Here, when the scan method of the display device 13 is the single screen method, the first 4K image corresponds to the odd-numbered lines of (frames of) the 4K output image, and the second 4K image corresponds to the even-numbered lines of the 4K output image.

The pixels of one line supplied from the memory block 72 and the pixels of one line supplied from the memory block 82 are supplied to the display device 13 in the corresponding order.

In other words, (pixels of) one line of the first 4K image read from the memory block 72 in the order indicated by the arrow R41 is supplied to the display device 13 as (pixels of) the odd-numbered line of the 4K output image.

Further, (pixels of) one line of the second 4K image read from the memory block 82 in the order indicated by the arrow R42 is supplied to the display device 13 as (pixels of) the even-numbered line of the 4K output image.

In the display device 13, one line of the first 4K image read from the memory block 72 in the order indicated by the arrow R41 and one line of the second 4K image read from the memory block 82 in the order indicated by the arrow R42 are displayed on the display screen 40 (FIG. 2) in the corresponding order.

As a result, the display device 13 displays the 4K output image according to the single screen method.

Here, reading in which one line of the first 4K image is sequentially read from the memory block 72, and one line of the second 4K image is sequentially read from the memory block 82 as described above with reference to FIG. 11 is hereinafter referred to as "sequential reading" as well.

As described above, according to the image processing unit 12 of FIG. 1, the resolution conversion corresponding to the scan method can be performed regardless of which of the normal cross-in-square method, the spring cross-in-square method, the bamboo blind method, and the single screen method is employed as the scan method of the display device 13.

Thus, since it is unnecessary to separately prepare a resolution converting device having a configuration corresponding to a corresponding scan method for each scan method of the display device 13, the resolution conversion can be performed at the low cost regardless of the scan method of the display device 13.

<Resolution Conversion when 2K Input Image is 3D Image>

The resolution conversion when the 2K input image is the 2D image has been described above, and resolution conversion when the 2K input image is a 3D image will be described below.

FIG. 12 is a diagram for describing up conversion of a 3D image.

Here, as a (transmission) method of a 3D image, there are a line-by-line method, a top- and bottom method, and a frame sequential method.

In the line-by-line method, lines (L-side lines) of an L (left) side image viewed by a left eye are arranged as one of odd-numbered lines and even-numbered lines of an image corresponding to one screen, for example, odd-numbered lines, and lines (R-side lines) of an R (right) side image viewed by a right eye are arranged as even-numbered lines that are the other lines.

In the top- and bottom method, lines of an L-side image are arranged in one of (regions of) the upper half and the lower half of an image corresponding to one screen, for example, the upper half, and lines of an R-side image are arranged in the other, that is, the lower half.

In the frame sequential method, a screen (frame) of an L-side image and a screen of an R-side image are alternately arranged in units of frames.

FIGS. 12A to 12C illustrate images obtained by up-converting a 3D image by the up-converting unit 23$_i$ of FIG. 1 when the 2K input image is, for example, the 3D image having the resolution of 2K.

In other words, FIG. 12A illustrates an up-conversion result obtained by up-converting a 3D image by the up-converting unit 23$_i$ when the 2K input image is the 3D image of the line-by-line method.

When the 3D image of the line-by-line method is up-converted by the up-converting unit 23$_i$ without any change, an image obtained as a result of up conversion is an image in which lines of (or strongly influenced by) an L-side image of an original 3D image and lines of (or strongly influenced by) an R-side image are arranged by two lines instead of the 3D image of the line-by-line method.

FIG. 12B shows an up-conversion result obtained by up-converting a 3D image by the up-converting unit 23$_i$ when the 2K input image is the 3D image of the top- and bottom method.

When the 3D image of the top- and bottom method is up-converted by the up-converting unit 23$_i$ without any change, an image obtained as a result of up conversion is an image in which (lines of) an L-side image is arranged in the upper half, and an R-side image is arranged in the lower half, that is, the 3D image of the top- and bottom method.

FIG. 12C shows an up-conversion result obtained by up-converting a 3D image by the up-converting unit 23$_i$ when the 2K input image is the 3D image of the frame sequential method.

When the 3D image of the frame sequential method is up-converted by the up-converting unit 23$_i$ without any change, an image obtained as a result of up conversion is an image in which (frames of) an L-side image and an R-side image are alternately arranged, that is, the 3D image of the frame sequential method.

Thus, when the display device 13 is, for example, the 4K display device of the single screen method or the bamboo blind method that employs a liquid crystal panel in which a polarizing plate in which polarization characteristics of respective lines are different is disposed on a display screen and is capable of displaying the 3D image of the line-by-line method, if the 3D image is up-converted by the up-converting unit 23$_i$ without any change, it is difficult to obtain the 3D image of the line-by-line method, and it is difficult to display the 3D image on the display device 13.

However, when a resolution converting device that performs resolution conversion of converting a 3D image of each method into a 3D image of the line-by-line method having the higher resolution is prepared for each method of the 3D image, the cost increases.

In this regard, the image processing unit 12 of FIG. 1 can perform not only resolution conversion of converting the 2K image of the 2D image into the 4K image of the 2D image displayed according to the scan method such as the normal cross-in-square method, the spring cross-in-square method, the bamboo blind method, or the single screen method, but also resolution conversion of converting the 2K image of the 3D image of the line-by-line method, the top- and bottom method, or the frame sequential method into the 4K image of the 3D image of the line-by-line method.

FIG. 13 is a diagram for describing a resolution conversion process performed by the image processing unit 12 when the 2K input image is the 3D image of the line-by-line method (the line-by-line 3D image).

When the 2K input image is the line-by-line 3D image, the frame memory unit 21 performs the same process (hereinafter referred to as a "single screen method process" or a "bamboo blind method process" as well) as when the scan method of the display device 13 is the single screen method or the bamboo blind method.

In other words, as described above with reference to FIG. 3C, the frame memory unit 21 stores frames of the 2K input image received from the image acquiring unit 11.

Then, the frame memory unit 21 reads pixels of odd-numbered lines that are a part of the 2K input image according to the sequence of the lower right direction scan, and supplies the read pixels to the vertical developing unit 22 as the first 2K image.

Further, the frame memory unit 21 reads pixels of even-numbered lines that are the remaining part of the 2K input image according to the sequence of the lower right direction scan, and supplies the read pixels to the vertical developing unit 22 as the second 2K image.

Thus, when the 2K input image is the line-by-line 3D image, the odd-numbered lines of the line-by-line 3D image, that is, the lines of the L-side image, are supplied from the frame memory unit 21 to the vertical developing unit 22 as the first 2K image. Further, the even-numbered lines of the line-by-line 3D image, that is, the lines of the R-side image, are supplied from the frame memory unit 21 to the vertical developing unit 22 as the second 2K image.

When the 2K input image is the line-by-line 3D image, the vertical developing unit 22 performs the same process (hereinafter referred to as a "normal cross-in-square method process" or a "spring cross-in-square method process" as well) as when the scan method of the display device 13 is the normal cross-in-square method or the spring cross-in-square method.

In other words, as described above with reference to FIG. 5, the vertical developing unit 22 selects four consecutive lines of the first 2K image as the first up-conversion line, and supplies the first up-conversion line to the up-converting unit 23$_1$.

Further, the vertical developing unit 22 selects four consecutive lines of the second 2K image as the second up-conversion line, and supplies the second up-conversion line to the up-converting unit $23_2$.

Thus, when the 2K input image is the line-by-line 3D image, the vertical developing unit 22 selects four consecutive lines of the L-side image serving as the first 2K image as the first up-conversion line, and supplies the first up-conversion line to the up-converting unit $23_1$.

Further, the vertical developing unit 22 selects four consecutive lines of the R-side image serving as the second 2K image as the second up-conversion line, and supplies the second up-conversion line to the up-converting unit $23_2$.

The up-converting unit $23_1$ generates pixels of the odd-numbered lines of the line-by-line 3D image serving as the 4K output image corresponding to the position of four corresponding lines, that is, pixels of the L-side image (of the 3D image serving as the 4K output image) using pixels of four lines of the L-side image serving as the first up-conversion line received from the vertical developing unit 22, and supplies the generated pixels to the scan changing unit 24 as the first 4K image.

Further, the up-converting unit $23_2$ generates pixels of the even-numbered lines of the line-by-line 3D image serving as the 4K output image corresponding to the position of four corresponding lines, that is, pixels of the R-side image (of the 3D image serving as the 4K output image) using pixels of four lines of the R-side image serving as the second up-conversion line received from the vertical developing unit 22, and supplies the generated pixels to the scan changing unit 24 as the second 4K image.

When the 2K input image is the line-by-line 3D image, the scan changing unit 24 performs the single screen method process or the bamboo blind method process which is the same process as when the scan method of the display device 13 is the single screen method or the bamboo blind method.

Here, when the scan method of the display device 13 is the single screen method or the bamboo blind method, as described above with reference to FIGS. 8 to 11, the scan changing unit 24 writes one line of the first 4K image in the memory block 71 or 72 and writes one line of the second 4K image in the memory block 81 or 82.

Further, the scan changing unit 24 sequentially reads (reads in units of four pixels in parallel) pixels of one line of the first 4K image from the memory block 71 or 72 according to the sequential reading described with reference to FIG. 11 (or the four-divisional reading described with reference to FIG. 10), and supplies the read pixels to the display device 13.

Further, the scan changing unit 24 sequentially reads (reads in units of four pixels in parallel) pixels of one line of the second 4K image from the memory block 81 or 82 according to the sequential reading described with reference to FIG. 11 (or the four-divisional reading described with reference to FIG. 10), and supplies the pixels of one line of the second 4K image read from the memory block 81 or 82 to the display device 13 after supplying the pixels of one line of the first 4K image read from the memory block 71 or 72 to the display device 13.

When the 2K input image is the line-by-line 3D image, as described above, the first 4K image corresponds to the L-side image, and the second 4K image corresponds to the R-side image, and thus the line-by-line 3D image is supplied from the scan changing unit 24 to the display device 13 as the 4K output image.

FIG. 14 is a diagram for describing a resolution conversion process performed by the image processing unit 12 when the 2K input image is the 3D image of the top- and bottom method (the top- and bottom 3D image).

When the 2K input image is the top- and bottom 3D image, the frame memory unit 21 performs the normal cross-in-square method process (or the spring cross-in-square method process) which is the same process as when the scan method of the display device 13 is the normal cross-in-square method.

In other words, as described above with reference to FIG. 3A, the frame memory unit 21 stores frames of the 2K input image received from the image acquiring unit 11.

Then, the frame memory unit 21 reads pixels of the upper half that are a part of the 2K input image according to the sequence of the lower right direction scan, and supplies the read pixels to the vertical developing unit 22 as the first 2K image.

Further, the frame memory unit 21 reads pixels of the lower half that are the remaining part of the 2K input image according to the sequence of the lower right direction scan, and supplies the read pixels to the vertical developing unit 22 as the second 2K image.

Thus, when the 2K input image is the top- and bottom 3D image, the upper half of the top- and bottom 3D image, that is, the lines of the L-side image, is supplied from the frame memory unit 21 to the vertical developing unit 22 as the first 2K image. Further, the lower half of the top- and bottom 3D image, that is, the lines of the R-side image, is supplied from the frame memory unit 21 to the vertical developing unit 22 as the second 2K image.

When the 2K input image is the top- and bottom 3D image, the vertical developing unit 22, the up-converting unit $23_1$ and $23_2$, and the scan changing unit 24 perform the same process when the 2K input image is the line-by-line 3D image which is described above with reference to FIG. 13.

Here, when the 2K input image is the top- and bottom 3D image, similarly to when the 2K input image is the line-by-line 3D image which is described above with reference to FIG. 13, the lines of the L-side image are supplied from the frame memory unit 21 to the vertical developing unit 22 as the first 2K image, and the lines of the R-side image from the frame memory unit 21 to the vertical developing unit 22 as the second 2K image.

Thus, the vertical developing unit 22, the up-converting units $23_1$ and $23_2$, and the scan changing unit 24 perform the same process when the 2K input image is the line-by-line 3D image which is described above with reference to FIG. 13, and thus the line-by-line 3D image is supplied from the scan changing unit 24 to the display device 13 as the 4K output image similarly to FIG. 13.

FIG. 15 is a diagram for describing a resolution conversion process performed by the image processing unit 12 when the 2K input image is the 3D image of the frame sequential method (frame sequential 3D image).

Further, when the 2K input image is the frame sequential 3D image, the frame memory unit 21 is assumed to have the memory capacity of two or more frames.

When the 2K input image is the frame sequential 3D image, the frame memory unit 21 stores frames of the frame sequential 3D image serving as the 2K input image supplied from the image acquiring unit 11.

Here, the frame memory unit 21 is assumed to have the memory capacity of two or more frames as described above, and the frame memory unit 21 stores two or more frames of the frame sequential 3D image in which (frames of) the L-side image and (frames of) of the R-side image are alternately arranged.

Further, when the latest frame is supplied, the frame memory unit 21 erases the oldest frame and stores the latest frame as in first in first out (FIFO).

When the 2K input image is the frame sequential 3D image, the frame memory unit 21 reads pixels of all frames of the L-side image according to the sequence of the lower right direction scan, and supplies the read pixels to the vertical developing unit 22 as the first 2K image.

Further, the frame memory unit 21 reads pixels of all frames of the R-side image according to the sequence of the lower right direction scan, and supplies the read pixels to the vertical developing unit 22 as the second 2K image.

Thus, when the 2K input image is the frame sequential 3D image, the frames of the L-side image of the frame sequential 3D image are supplied from the frame memory unit 21 to the vertical developing unit 22 as the first 2K image. Further, the frames of the R-side image of the frame sequential 3D image are supplied from the frame memory unit 21 to the vertical developing unit 22 as the second 2K image.

When the 2K input image is the frame sequential 3D image, the vertical developing unit 22, the up-converting units 23$_1$ and 23$_2$, and the scan changing unit 24 perform the same process as when the 2K input image is the line-by-line 3D image which is described above with reference to FIG. 13.

Here, when the 2K input image is the frame sequential 3D image, similarly to when the 2K input image is the line-by-line 3D image which is described above with reference to FIG. 13, (lines of) the frames of the L-side image are supplied from the frame memory unit 21 to the vertical developing unit 22 as the first 2K image, and (lines of) the frames of the R-side image are supplied from the frame memory unit 21 to the vertical developing unit 22 as the second 2K image.

Thus, the vertical developing unit 22, the up-converting units 23$_1$ and 23$_2$, and the scan changing unit 24 perform the same process as when the 2K input image is the line-by-line 3D image which is described above with reference to FIG. 13, and thus the line-by-line 3D image is supplied from the scan changing unit 24 to the display device 13 as the 4K output image similarly to FIG. 13.

Further, in the resolution conversion of converting the 2K input image into the 4K output image, up conversion of doubling the number of pixels in both the horizontal and vertical directions in the first and second 2K image is performed on the 2D image and the 3D image of the method other than the frame sequential method through the up-converting units 23$_1$ and 23$_2$, but up conversion of doubling the number of pixels only in the horizontal direction is performed on the frame sequential 3D image.

This is because the number of pixels in the vertical direction in the first and second 2K images of the frame sequential 3D image is twice the number of pixels in the vertical direction in the first and second 2K images of the 2D image and the 3D image of the method other than the frame sequential method.

Further, for the 2D image and the 3D image of the method other than the frame sequential method, in the frame memory unit 21, the first and second 2K images are obtained from one frame of the 2K input image, but for the frame sequential 3D image, in the frame memory unit 21, only one of the first and second 2K images is obtained from one frame of the 2K input image.

For this reason, for the frame sequential 3D image, the frame memory unit 21 stores a plurality of frames, reads pixels of all frames of the L-side image among the plurality of frames as the first 2K image, and reads pixels of all frames of the R-side image as the second 2K image.

FIG. 16 is a diagram for describing storage content of the frame memory unit 21 and the first and second 2K images for the frame sequential 3D image.

Referring to FIG. 16, the frame memory unit 21 has the memory capacity of four frames. Further, in FIG. 16, a frame L#n of the L-side image and a frame R#n of the R-side image are frames forming a pair in a 3D image.

Here, n represents a frame number that is an order of a frame, and the frame L#n of the L-side image and the frame R#n of the R-side image that form a pair in the 3D image match each other.

As illustrated in FIG. 16, the frame memory unit 21 can read the latest frame of the L-side image among frames of the frame sequential 3D image stored in the frame memory unit 21 as the first 2K image, and read the latest frame of the R-side image as the second 2K image.

In this case, the frame number of the frame of the L-side image serving as the first 2K image may not match the frame number of the frame of the R-side image serving as the second 2K image.

Further, as illustrated in FIG. 16, the frame memory unit 21 may read the frame of the L-side image and the frame of the R-side image of the latest set among sets of the frame of the L-side image and the frame of the R-side image that match in the frame number among frames of the frame sequential 3D image stored in the frame memory unit 21 as the first 2K image and the second 2K image.

In this case, the frame number of the frame of the L-side image serving as the first 2K image matches the frame number of the frame of the R-side image serving as the second 2K image.

FIG. 17 is a diagram for describing the operations of the respective blocks configuring the image processing unit 12 of FIG. 1.

When the 2K input image is the 2D image and the scan method of the display device 13 is the normal cross-in-square method or the spring cross-in-square method, the frame memory unit 21 stores the frame of the 2D image serving as the 2K input image.

Then, the frame memory unit 21 reads the upper half and the lower half of the frame of the 2D image serving as the 2K input image as the first 2K image and the second 2K image.

Further, the vertical developing unit 22 independently acquires the first up-conversion line and the second up-conversion line from the respective lines of the first 2K image and the second 2K image.

Further, the up-converting unit 23$_1$ performs up conversion using the first up-conversion line, and generates the first 4K image including the upper half of the 4K output image.

Further, the up-converting unit 23$_2$ performs up conversion using the second up-conversion line, and generates the second 4K image including the lower half of the 4K output image.

Then, the scan changing unit 24 writes the lines of the first 4K image and the lines of the second 4K image, performs the two-divisional reading described above with reference to FIGS. 8 and 9, and generates the 2D image that is the 4K output image of the normal cross-in-square method or the spring cross-in-square method.

When the 2K input image is the 2D image and the scan method of the display device 13 is the single screen method, the frame memory unit 21 stores the frame of the 2D image serving as the 2K input image.

Then, the frame memory unit 21 reads the odd-numbered lines and the even-numbered lines of the frame of the 2D image serving as the 2K input image as the first 2K image and the second 2K image.

Further, the vertical developing unit 22 mixes the respective lines of the first 2K image and the second 2K image as described above with reference to FIG. 6, and acquires the first up-conversion line and the second up-conversion line from the mixed lines.

Further, the up-converting unit $23_1$ performs up conversion using the first up-conversion line, and generates the first 4K image including the odd-numbered lines of the 4K output image.

Further, the up-converting unit $23_2$ performs up conversion using the second up-conversion line, and generates the second 4K image including the even-numbered lines of the 4K output image.

Then, the scan changing unit 24 writes the lines of the first 4K image and the lines of the second 4K image, performs the sequential reading described above with reference to FIG. 11, and generates the 2D image that is the 4K output image of the single screen method.

When the 2K input image is the 2D image and the scan method of the display device 13 is the bamboo blind method, the frame memory unit 21, the vertical developing unit 22, the up-converting unit $23_1$ and the up-converting unit $23_2$ perform the same process as when the 2K input image is the 2D image and the scan method of the display device 13 is the single screen method, and generate the first 4K image including the odd-numbered lines of the 4K output image and the second 4K image including the even-numbered lines of the 4K output image.

Then, the scan changing unit 24 writes the lines of the first 4K image and the lines of the second 4K image, performs the four-divisional reading described above with reference to FIG. 10, and generates the 2D image that is the 4K output image of the bamboo blind method.

When the 2K input image is the line-by-line 3D image, the frame memory unit 21 stores the frame of the line-by-line 3D image serving as the 2K input image. Further, the odd-numbered lines and the even-numbered lines of the line-by-line 3D image stored in the frame memory unit 21 are the L-side image and the R-side image.

The frame memory unit 21 reads the odd-numbered lines and the even-numbered lines of the frame of the line-by-line 3D image serving as the 2K input image as the first 2K image and the second 2K image.

Further, the vertical developing unit 22 independently acquires the first up-conversion line and the second up-conversion line from the respective lines of the first 2K image and the second 2K image.

Further, the up-converting unit $23_1$ performs up conversion using the first up-conversion line, and generates the first 4K image including the odd-numbered lines of the 4K output image.

Further, the up-converting unit $23_2$ performs up conversion using the second up-conversion line, and generates the second 4K image including the even-numbered lines of the 4K output image.

Then, the scan changing unit 24 writes the lines of the first 4K image and the lines of the second 4K image, performs the four-divisional reading described above with reference to FIG. 10 or the sequential reading described above with reference to FIG. 11, and generates the line-by-line 3D image that is the 4K output image.

When the 2K input image is the top- and bottom 3D image, the frame memory unit 21 stores the frame of the top- and bottom 3D image serving as the 2K input image. Further, the upper half and the lower half of the top- and bottom 3D image stored in the frame memory unit 21 are the L-side image and the R-side image.

The frame memory unit 21 reads the upper half and the lower half of the frame of the top- and bottom 3D image serving as the 2K input image as the first 2K image and the second 2K image.

Further, the vertical developing unit 22 independently acquires the first up-conversion line and the second up-conversion line from the respective lines of the first 2K image and the second 2K image.

Further, the up-converting unit $23_1$ performs up conversion using the first up-conversion line, and generates the first 4K image including the odd-numbered lines of the 4K output image.

Further, the up-converting unit $23_2$ performs up conversion using the second up-conversion line, and generates the second 4K image including the even-numbered lines of the 4K output image.

Then, the scan changing unit 24 writes the lines of the first 4K image and the lines of the second 4K image, performs the four-divisional reading described above with reference to FIG. 10 or the sequential reading described above with reference to FIG. 11, and generates the line-by-line 3D image that is the 4K output image.

When the 2K input image is the frame sequential 3D image, the frame memory unit 21 stores the frame of the frame sequential 3D image serving as the 2K input image. Further, the frame memory unit 21 alternately stores the L-side image and the R-side image alternately arranged in the frame sequential 3D image.

The frame memory unit 21 reads the frame of the L-side image and the frame of the R-side image of the frame sequential 3D image serving as the 2K input image as the first 2K image and the second 2K image.

Further, the vertical developing unit 22 independently acquires the first up-conversion line and the second up-conversion line from the respective lines of the first 2K image and the second 2K image.

Further, the up-converting unit $23_1$ performs up conversion using the first up-conversion line, and generates the first 4K image including the odd-numbered lines of the 4K output image.

Further, the up-converting unit $23_2$ performs up conversion using the second up-conversion line, and generates the second 4K image including the even-numbered lines of the 4K output image.

Then, the scan changing unit 24 writes the lines of the first 4K image and the lines of the second 4K image, performs the four-divisional reading described above with reference to FIG. 10 or the sequential reading described above with reference to FIG. 11, and generates the line-by-line 3D image that is the 4K output image.

As described above, according to the image processing unit 12 of FIG. 1, it is possible to perform resolution conversion of converting the 3D image having any of the line-by-line method, the top- and bottom method, and the frame sequential method into the 3D image of the line-by-line method.

Thus, it is unnecessary to prepare a separate resolution converting device for resolution conversion according to each scan method of the display device 13 or according to whether the resolution conversion target is the 2D image or the 3D image, and thus it is possible to perform resolution conversion of both a 2D image and a 3D image at a low cost.

Figure 18:
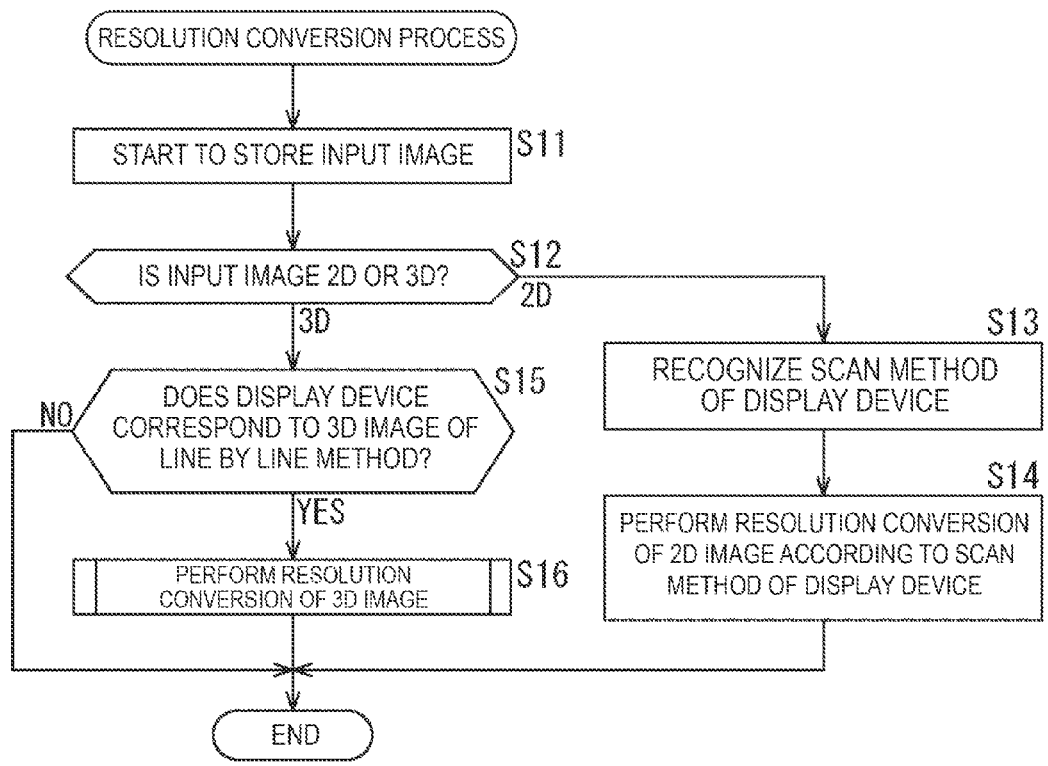
FIG. 18 is a flowchart for describing a resolution conversion process performed by the image processing unit 12.

FIG. 18 is a flowchart for describing the resolution conversion process performed by the image processing unit 12 of FIG. 1.

When the 2K input image is supplied from the image acquiring unit 11 to the image processing unit 12, in step S11, the frame memory unit 21 starts to store the 2K input image received from the image acquiring unit 11, and the process proceeds to step S12.

In step S12, the control unit 25 determines whether the 2K input image stored in the frame memory unit 21 is a 2D image or a 3D image.

Here, the determining of whether the 2K input image is a 2D image or a 3D image in step S12 may be performed, for example, according to a designation by the user, an overhead (side information) included in the 2K input image, or the like.

When it is determined in step S12 that the 2K input image is the 2D image, the process proceeds to step S13, the control unit 25 recognizes the scan method of the display device 13, and the process proceeds to step S14.

Here, the recognizing of the scan method of the display device 13 in step S13 may be performed based on, for example, a designation by the user, acquisition of scan method information from the display device 13, or the like.

In step S14, the frame memory unit 21 or the scan changing unit 24 performs the resolution conversion of the 2K input image according to the scan method of the display device 13 as described above with reference to FIGS. 3 to 11 and supply the 2D image that is the 4K output image obtained as a result to the display device 13, and the process ends.

Meanwhile, when it is determined in step S12 that the 2K input image is the 3D image, the process proceeds to step S15, and the control unit 25 determines whether the display device 13 is a display device that supports the line-by-line 3D image.

Here, the determining of whether the display device 13 is a display device that supports the line-by-line 3D image in step S15 may be performed based on, for example, a designation by the user, acquisition of information from the display device 13, or the like.

When it is determined in step S15 that the display device 13 is not a display device that supports the line-by-line 3D image, the process ends.

Further, when it is determined in step S15 that the display device 13 is a display device that supports the line-by-line 3D image, the frame memory unit 21 or the scan changing unit 24 performs the resolution conversion of the 3D image that is the 2K input image according to the method of the 3D image that is the 2K input image as described above with reference to FIGS. 13 to 15 and supply the line-by-line 3D image that is the resultant 4K output image to the display device 13, and the process ends.

Figure 19:
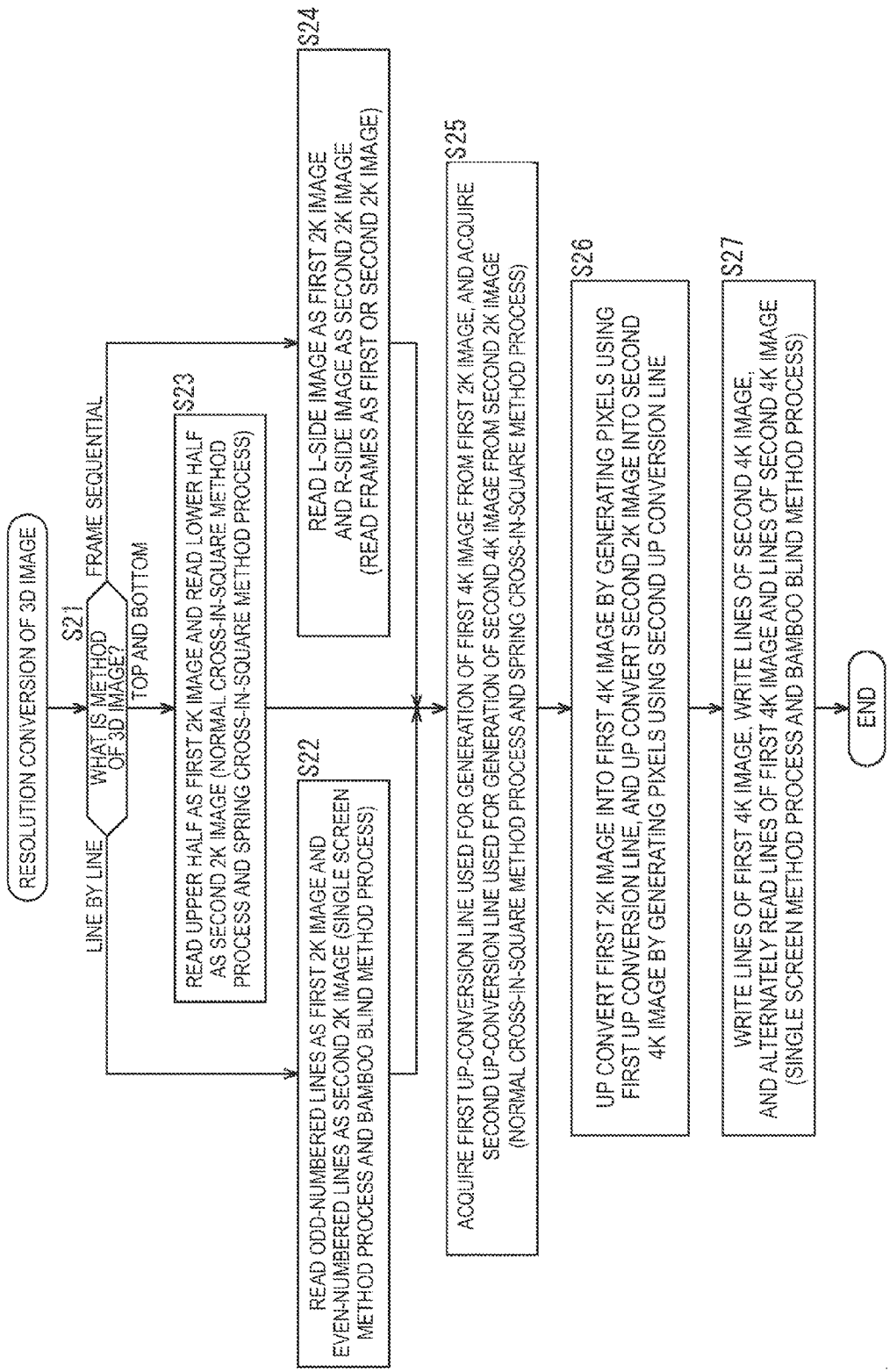
FIG. 19 is a flowchart for describing a resolution conversion process of a 3D image.

FIG. 19 is a flowchart for describing a resolution conversion process of a 3D image performed in step S16 of FIG. 18.

In step S21, the control unit 25 determines a method of the 3D image that is the 2K input image stored in the frame memory unit 21.

Here, the determining of the method of the 3D image in step S21 may be performed based on, for example, a designation by the user, an overhead included in the 3D image that is the 2K input image, or the like.

When it is determined in step S21 that the method of the 3D image that is the 2K input image stored in the frame memory unit 21 is the line-by-line method, the process proceeds to step S22. In step S22, the frame memory unit 21 reads the odd-numbered lines and the even-numbered lines of the frame of the line-by-line 3D image serving as the 2K input image as the first 2K image and the second 2K image and supplies the first 2K image and the second 2K image to the vertical developing unit 22, and then the process proceeds to step S25.

In step S25, the vertical developing unit 22 independently acquires the first up-conversion line and the second up-conversion line from the respective lines of the first 2K image and the second 2K image received from the frame memory unit 21. Then, the vertical developing unit 22 supplies the first up-conversion line to the up-converting unit 23$_1$, and supplies the second up-conversion line to the up-converting unit 23$_2$, and the process proceeds from step S25 to step S26.

In step S26, the up-converting unit 23$_1$ performs up conversion for generating pixels of the 4K output image using the first up-conversion line received from the vertical developing unit 22, generates the first 4K image including the odd-numbered lines of the 4K output image, and supplies the first 4K image including the odd-numbered lines of the 4K output image to the scan changing unit 24.

Further, in step S26, the up-converting unit 23$_2$ performs up conversion for generating pixels of the 4K output image using the second up-conversion line received from the vertical developing unit 22, generates the first 4K image including the even-numbered lines of the 4K output image, and supplies the first 4K image including the even-numbered lines of the 4K output image to the scan changing unit 24.

Then, the process proceeds from step S26 to step S27. In step S27, the scan changing unit 24 writes the lines of the first 4K image received from the up-converting unit 23$_1$ and the lines of the second 4K image received from the up-converting unit 23$_2$, performs the four-divisional reading described above with reference to FIG. 10 or the sequential reading described above with reference to FIG. 11, generates the line-by-line 3D image that is the 4K output image in which the lines of the first 4K image and the lines of the second 4K image are alternately arranged, and supplies the line-by-line 3D image to the display device, and then the process returns.

Meanwhile, when it is determined in step S21 that the method of the 3D image that is the 2K input image stored in the frame memory unit 21 is the top- and bottom method, the process proceeds to step S23. In step S23, the frame memory unit 21 reads the upper half and the lower half of the frame of the top- and bottom 3D image serving as the 2K input image as the first 2K image and the second 2K image.

Further, in step S23, the frame memory unit 21 supplies the first 2K image and the second 2K image to the vertical developing unit 22, and the process proceeds to step S25. Then, the above-described process of steps S25 to S27 is performed.

Further, when it is determined in step S21 that the method of the 3D image that is the 2K input image stored in the frame memory unit 21 is the frame sequential method, the process proceeds to step S24. In step S24, the frame memory unit 21 reads the frame of the L-side image and the frame of the R-side image of the frame sequential 3D image serving as the 2K input image as the first 2K image and the second 2K image.

Further, in step S24, the frame memory unit 21 supplies the first 2K image and the second 2K image to the vertical developing unit 22, and the process proceeds to step S25. Then, the above-described process of steps S25 to S27 is performed.

[Description of Computer to which Present Technology is Applied]

A series of processes described above may be implemented by hardware or software. When the series of processes is implemented by software, a program configuring the software is installed in a general-purpose computer or the like.

Figure 20:
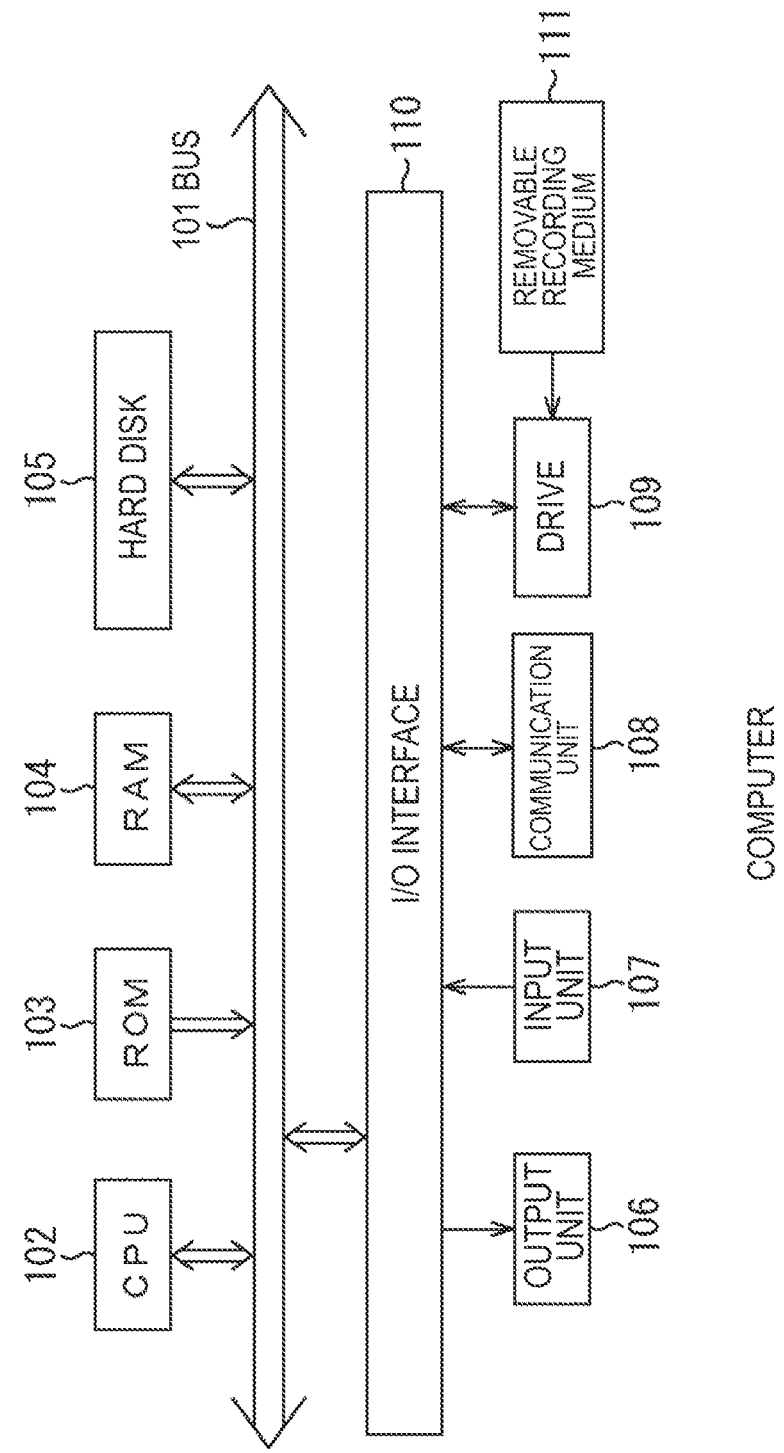
FIG. 20 is a block diagram illustrating an exemplary configuration of an embodiment of a computer to which an embodiment of the present technology is applied.

FIG. 20 illustrates an exemplary configuration of an embodiment of a computer in which a program for executing the series of processes described above is installed.

The program may be recorded in a hard disk 105 or a ROM 103 which is a recording medium equipped in the computer in advance.

Alternatively, the program may be stored (recorded) in a removable recording medium 111. The removable recording medium 111 may be provided as so-called package software. Here, examples of the removable recording medium 111 include a flexible disk, a compact disc read only memory (CD-ROM), a magneto optical (MO) disc, a digital versatile disc (DVD), a magnetic disk, and a semiconductor memory.

Further, the program may be installed in the computer from the removable recording medium 111 or may be downloaded to the computer via a communication network or a broadcast network and then installed in the built-in hard disk 105. In other words, the program may be wirelessly transmitted from a download site to the computer via a satellite for digital satellite broadcasting or may be transmitted from a download site to the computer via a network such as a local area network (LAN) or the Internet.

The computer includes a central processing unit (CPU) 102 therein, and an input/output (I/O) interface 110 is connected to the CPU 102 via a bus 101.

Upon receiving a command generated as the user operates an input unit 107 via the I/O interface 110, the CPU 102 executes the program stored in a read only memory (ROM) 103 according to the command. Alternatively, the CPU 102 loads the program stored in the hard disk 105 in a random access memory (RAM) 104, and executes the program.

As a result, the CPU 102 performs the process according to the above-described flowchart or the process performed by the configuration of the above-described block diagram. Then, the CPU 102 outputs, transmits, or records the processing result through an output unit 106, a communication unit 108, or the hard disk 105 via, for example, the I/O interface 110 as necessary.

The input unit 107 includes a keyboard, a mouse, a microphone, or the like. Further, the output unit 106 includes a liquid crystal display (LCD), a speaker, or the like.

Processing performed herein by the computer according to a program does not necessarily have to be performed chronologically in the order described in a flow chart. That is, processing performed by the computer according to a program also includes processing performed in parallel or individually (for example, parallel processing or processing by an object).

The program may be processed by one computer (processor) or by a plurality of computers in a distributed manner. Further, the program may be performed after being transferred to a remote computer.

An embodiment of the disclosure is not limited to the embodiments described above, and various changes and modifications may be made without departing from the scope of the disclosure.

For example, in the present embodiment, the 2K image is employed as the input image, but an image having a different resolution may be employed as the input image.

Further, in the present embodiment, the 4K display device is employed as the display device 13, but a display device having a resolution other than 4K may be employed as the display device 13.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus, including:
   a memory unit configured to store an input image and read a part or all of the input image as a first image and a second image;
   an acquiring unit configured to acquire an up-conversion line that is a line of pixels used for up conversion from the first and second images;
   an up-converting unit configured to perform up conversion using pixels of the up-conversion line, and generate a first up-converted image obtained by up converting the first image and a second up-converted image obtained by up converting the second image; and
   a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device,
   wherein, when the input image is a three dimensional (3D) image,
      the memory unit reads, in the 3D image, an L-side image viewed with a left eye as the first image, and reads an R-side image viewed with a right eye as the second image,
      the acquiring unit acquires a first up-conversion line that is a line of pixels used for up conversion for generating the first up-converted image from the first image, and acquires a second up-conversion line that is a line of pixels used for up conversion for generating the second up-converted image from the second image, and
      the generating unit generates an up-converted 3D image of a line-by-line method in which the pixels of the first up-converted image written in the first memory block and the pixels of the second up-converted image written in the second memory block are alternately arranged in unit of lines by up converting the 3D image.

(2) The image processing apparatus according to (1),
   wherein, when the input image is a 3D image of the line-by-line method in which L-side lines, which are lines configuring the L-side image, and R-side lines, which are lines configuring the R-side image, are alternately arranged,
      the memory unit reads the L-side lines of the 3D image of the line-by-line method as the first image, and reads the R-side lines of the 3D image of the line-by-line method as the second image.

(3) The image processing apparatus according to (1) or (2),
   wherein, when the input image is a 3D image of a top- and bottom method in which the L-side image is arranged in one of a region of an upper half and a region of a lower half of a screen, and the R-side image is arranged in the other, the memory unit reads the region of the upper half of the 3D image of the top- and bottom method as the first image, and reads the region of the lower half of the 3D image as the second image.

(4) The image processing apparatus according to any one of (1) to (3), wherein, when the input image is a 3D image of a frame sequential method in which the L-side image and the R-side image are alternately arranged in units of screens, the memory unit reads, in a screen of the input image, a screen of the L-side image as the first image, and reads a screen of the R-side image as the second image.

(5) The image processing apparatus according to any one of (1) to (4), wherein, when the input image is a two dimensional (2D) image, and the scan method of the display device is a normal cross-in-square method in which scanning is performed in a direction from an upper left to a lower right in each of four small display screens obtained by dividing a display screen of the display device in half in a horizontal direction and a vertical direction, the memory unit reads pixels of a region of an upper half of the 2D image as the first image in the direction from the upper left to the lower right, and reads pixels of a region of a lower half of the 2D image as the second image in the direction from the upper left to the lower right, the acquiring unit acquires the first up-conversion line from the first image, and acquires the second up-conversion line from the second image, the generating unit sequentially writes lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and the generating unit simultaneously performs sequentially reading the pixels of the first up-converted image from the first line memory and a second line memory among the four line memories of the first memory block in a same order as a writing order, sequentially reading the pixels of the first up-converted image from the third and fourth line memories among the four line memories of the first memory block in a same order as the writing order, sequentially reading the pixels of the second up-converted image from the first line memory and a second line memory among the four line memories of the second memory block in a same order as the writing order, and sequentially reading the pixels of the second up-converted image from the third and fourth line memories among the four line memories of the second memory block in a same order as the writing order.

(6) The image processing apparatus according to any one of (1) to (5), wherein, when the input image is a 2D image, and the scan method of the display device is a spring cross-in-square method in which scanning is performed in directions from a center of a display screen toward four corners in four small display screens obtained by dividing the display screen of the display device in half in a horizontal direction and a vertical direction, the memory unit reads pixels of a region of an upper half of the 2D image as the first image in a direction from a lower left to an upper right, and reads pixels of a region of a lower half of the 2D image as the second image in a direction from an upper left to a lower right, the acquiring unit acquires the first up-conversion line from the first image, and acquires the second up-conversion line from the second image, the generating unit sequentially writes lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and the generating unit simultaneously performs sequentially reading the pixels of the first up-converted image from the first line memory and a second line memory among the four line memories of the first memory block in a reverse order as a writing order, sequentially reading the pixels of the first up-converted image from the third and fourth line memories among the four line memories of the first memory block in a same order as the writing order, sequentially reading the pixels of the second up-converted image from the first line memory and a second line memory among the four line memories of the second memory block in a reverse order from the writing order, and sequentially reading the pixels of the second up-converted image from the third and fourth line memories among the four line memories of the second memory block in a same order as the writing order.

(7) The image processing apparatus according to any one of (1) to (6), wherein, when the input image is a 2D image, and the scan method of the display device is a bamboo blind method in which scanning is performed in a direction from an upper left to a lower right in each of four small display screens obtained by equally dividing a display screen of the display device into four in a horizontal direction, the memory unit reads odd-numbered lines of the 2D image as the first image, and reads even-numbered lines of the 2D image as the second image, the acquiring unit acquires the first up-conversion line and the second up-conversion line from an image in which lines of the first image and lines of the second image are alternately arranged, and the generating unit performs sequentially writing lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and simultaneously reading the pixels of the first up-converted image from the four line memories of the first memory block, and simultaneously reading the pixels of the second up-converted image from the four line memories of the second memory block.

(8) The image processing apparatus according to any one of (1) to (7), wherein, when the input image is a 2D image, and the scan method of the display device is a single screen method in which scanning is performed in a direction from an upper left to a lower right on a display screen of the display device, the memory unit reads odd-numbered lines of the 2D image as the first image, and reads even-numbered lines of the 2D image as the second image, the acquiring unit acquires the first up-conversion line and the second up-conversion line from an image in which lines of the first image and lines of the second image are alternately arranged, and the generating unit performs writing lines of the first up-converted image in the first memory block and writing lines of the second up-converted image in the second memory block, and reading the lines of the first up-converted image from the first memory block and reading the lines of the second up-converted image from the second memory block.

(9) An image processing method, including:

storing an input image and reading a part or all of the input image as a first image and a second image;

acquiring an up-conversion line that is a line of pixels used for up conversion from the first and second images;

performing up conversion using pixels of the up-conversion line, and generating a first up-converted image obtained by up converting the first image and a second up-converted image obtained by up converting the second image;

writing the first up-converted image in a first memory block and writing the second up-converted image in a second memory block;

reading pixels of the first up-converted image written in the first memory block in a certain order decided according to a scan method of a display device configured to display an output image obtained by up converting the input image, and reading pixels of the second up-converted image written in the second memory block in the certain order; and generating the output image according to the scan method of the display device, wherein, when the input image is a three dimensional (3D) image, in the reading of the first and second images, an L-side image viewed with a left eye in the 3D image is read as the first image, and an R-side image viewed with a right eye is read as the second image, in the acquiring of the up-conversion line, a first up-conversion line that is a line of pixels used for up conversion for generating the first up-converted image is acquired from the first image, and a second up-conversion line that is a line of pixels used for up conversion for generating the second up-converted image is acquired from the second image, and in the generating of the output image, an up-converted 3D image of a line-by-line method in which the pixels of the first up-converted image written in the first memory block and the pixels of the second up-converted image written in the second memory block are alternately arranged in units of lines is generated by up converting the 3D image.

(10) A program for causing a computer to function as:

a memory unit configured to store an input image and read a part or all of the input image as a first image and a second image;

an acquiring unit configured to acquire an up-conversion line that is a line of pixels used for up conversion from the first and second images;

an up-converting unit configured to perform up conversion using pixels of the up-conversion line, and generate a first up-converted image obtained by up converting the first image and a second up-converted image obtained by up converting the second image; and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device, wherein, when the input image is a three dimensional (3D) image, the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in units of lines by up converting the 3D image.

What is claimed is:

1. An image processing apparatus, comprising circuitry configured to function as:

a memory unit configured to store an input image and read a part or all of the input image as a first image and a second image;

an acquiring unit configured to acquire an up-conversion line that is a line of pixels used for up conversion from the first and second images;

an up-converting unit configured to perform up conversion using pixels of the up-conversion line, and generate a first up-converted image obtained by up converting the first image and a second up-converted image obtained by up converting the second image; and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device, wherein, when the input image is a three dimensional (3D) image, the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in unit of lines by up converting the 3D image; and wherein, when the input image is a two dimensional (2D) image, and the scan method of the display device is a normal cross-in-square method in which scanning is performed in a direction from an upper left to a lower right in each of four small display screens obtained by dividing a display screen of the display device in half in a horizontal direction and a vertical direction, the memory unit reads pixels of a region of an upper half of the 2D image as the first image in the direction from the upper left to the lower right, and reads pixels of a region of a lower half of the 2D image as the second image in the direction from the upper left to the lower right, the acquiring unit acquires the first up-conversion line from the first image, and acquires the second up-conversion line from the second image, the generating unit sequentially writes lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and the generating unit simultaneously performs sequentially reading the pixels of the first up-converted image from the first line memory and a second line memory among the four line memories of the first memory block in a same order as a writing order, sequentially reading the pixels of the first up-converted image from the third and fourth line memories among the four line memories of the first memory block in a same order as the writing order, sequentially reading the pixels of the second up-converted image from the first line memory and a second line memory among the four line memories of the second memory block in a same order as the writing order, and sequentially reading the pixels of the second up-converted image from the third and fourth line memories among the four line memories of the second memory block in a same order as the writing order.

2. The image processing apparatus according to claim 1, wherein, when the input image is a 3D image of the line-by-line method in which L-side lines, which are lines configuring the L-side image, and R-side lines, which are lines configuring the R-side image, are alternately arranged, the memory unit reads the L-side lines of the 3D image of the line-by-line method as the first image, and reads the R-side lines of the 3D image of the line-by-line method as the second image.

3. The image processing apparatus according to claim 1, wherein, when the input image is a 3D image of a top-and bottom method in which the L-side image is arranged in one of a region of an upper half and a region of a lower half of a screen, and the R-side image is arranged in the other, the memory unit reads the region of the upper half of the 3D image of the top-and bottom method as the first image, and reads the region of the lower half of the 3D image as the second image.

4. The image processing apparatus according to claim 1, wherein, when the input image is a 3D image of a frame sequential method in which the L-side image and the R-side image are alternately arranged in units of screens, the memory unit reads, in a screen of the input image, a screen of the L-side image as the first image, and reads a screen of the R-side image as the second image.

5. The image processing apparatus according to claim 1, wherein, when the input image is a 2D image, and the scan method of the display device is a single screen method in which scanning is performed in a direction from an upper left to a lower right on a display screen of the display device, the memory unit reads odd-numbered lines of the 2D image as the first image, and reads even-numbered lines of the 2D image as the second image, the acquiring unit acquires the first up-conversion line and the second up-conversion line from an image in which lines of the first image and lines of the second image are alternately arranged, and the generating unit performs writing lines of the first up-converted image in the first memory block and writing lines of the second up-converted image in the second memory block, and reading the lines of the first up-converted image from the first memory block and reading the lines of the second up-converted image from the second memory block.

6. An image processing apparatus, comprising circuitry configured to function as:
- a memory unit configured to store an input image and read a part or all of the input image as a first image and a second image;
- an acquiring unit configured to acquire an up-conversion line that is a line of pixels used for up conversion from the first and second images;
- an up-converting unit configured to perform up conversion using pixels of the up-conversion line, and generate a first up-converted image obtained by up converting the first image and a second up-converted image obtained by up converting the second image; and
- a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device,
- wherein, when the input image is a three dimensional (3D) image,
  - the memory unit reads, in the 3D image, an L-side image viewed with a left eye as the first image, and reads an R-side image viewed with a right eye as the second image,
  - the acquiring unit acquires a first up-conversion line that is a line of pixels used for up conversion for generating the first up-converted image from the first image, and acquires a second up-conversion line that is a line of pixels used for up conversion for generating the second up-converted image from the second image, and
  - the generating unit generates an up-converted 3D image of a line-by-line method in which the pixels of the first up-converted image written in the first memory block and the pixels of the second up-converted image written in the second memory block are alternately arranged in unit of lines by up converting the 3D image; and
- wherein, when the input image is a 2D image, and the scan method of the display device is a spring cross-in-square method in which scanning is performed in directions from a center of a display screen toward four corners in four small display screens obtained by dividing the display screen of the display device in half in a horizontal direction and a vertical direction,
  - the memory unit reads pixels of a region of an upper half of the 2D image as the first image in a direction from a lower left to an upper right, and reads pixels of a region of a lower half of the 2D image as the second image in a direction from an upper left to a lower right,
  - the acquiring unit acquires the first up-conversion line from the first image, and acquires the second up-conversion line from the second image,
  - the generating unit sequentially writes lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and
  - the generating unit simultaneously performs
    - sequentially reading the pixels of the first up-converted image from the first line memory and a second line memory among the four line memories of the first memory block in a reverse order as a writing order,
    - sequentially reading the pixels of the first up-converted image from the third and fourth line memories among the four line memories of the first memory block in a same order as the writing order,
    - sequentially reading the pixels of the second up-converted image from the first line memory and a second line memory among the four line memories of the second memory block in a reverse order from the writing order, and
    - sequentially reading the pixels of the second up-converted image from the third and fourth line memories among the four line memories of the second memory block in a same order as the writing order.

7. The image processing apparatus according to claim 6, wherein, when the input image is a 3D image of the line-by-line method in which L-side lines, which are lines configuring the L-side image, and R-side lines, which are lines configuring the R-side image, are alternately arranged,
the memory unit reads the L-side lines of the 3D image of the line-by-line method as the first image, and reads the R-side lines of the 3D image of the line-by-line method as the second image.

8. The image processing apparatus according to claim 6, wherein, when the input image is a 3D image of a top-and bottom method in which the L-side image is arranged in one of a region of an upper half and a region of a lower half of a screen, and the R-side image is arranged in the other,
the memory unit reads the region of the upper half of the 3D image of the top- and bottom method as the first image, and reads the region of the lower half of the 3D image as the second image.

9. The image processing apparatus according to claim 6, wherein, when the input image is a 3D image of a frame sequential method in which the L-side image and the R-side image are alternately arranged in units of screens,
the memory unit reads, in a screen of the input image, a screen of the L-side image as the first image, and reads a screen of the R-side image as the second image.

10. The image processing apparatus according to claim 6, wherein, when the input image is a 2D image, and the scan method of the display device is a single screen method in which scanning is performed in a direction from an upper left to a lower right on a display screen of the display device,
the memory unit reads odd-numbered lines of the 2D image as the first image, and reads even-numbered lines of the 2D image as the second image,
the acquiring unit acquires the first up-conversion line and the second up-conversion line from an image in which lines of the first image and lines of the second image are alternately arranged, and the generating unit performs writing lines of the first up-converted image in the first memory block and writing lines of the second up-converted image in the second memory block, and reading the lines of the first up-converted image from the first memory block and reading the lines of the second up-converted image from the second memory block.

11. An image processing apparatus, comprising circuitry configured to function as:

a memory unit configured to store an input image and read a part or all of the input image as a first image and a second image;

an acquiring unit configured to acquire an up-conversion line that is a line of pixels used for up conversion from the first and second images;

an up-converting unit configured to perform up conversion using pixels of the up-conversion line, and generate a first up-converted image obtained by up converting the first image and a second up-converted image obtained by up converting the second image; and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device, wherein, when the input image is a three dimensional (3D) image, the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in unit of lines by up converting the 3D image; and wherein, when the input image is a 2D image, and the scan method of the display device is a bamboo blind method in which scanning is performed in a direction from an upper left to a lower right in each of four small display screens obtained by equally dividing a display screen of the display device into four in a horizontal direction, the memory unit reads odd-numbered lines of the 2D image as the first image, and reads even-numbered lines of the 2D image as the second image, the acquiring unit acquires the first up-conversion line and the second up-conversion line from an image in which lines of the first image and lines of the second image are alternately arranged, and the generating unit performs sequentially writing lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and simultaneously reading the pixels of the first up-converted image from the four line memories of the first memory block, and simultaneously reading the pixels of the second up-converted image from the four line memories of the second memory block.

12. The image processing apparatus according to claim 11, wherein, when the input image is a 3D image of the line-by-line method in which L-side lines, which are lines configuring the L-side image, and R-side lines, which are lines configuring the R-side image, are alternately arranged, the memory unit reads the L-side lines of the 3D image of the line-by-line method as the first image, and reads the R-side lines of the 3D image of the line-by-line method as the second image.

13. The image processing apparatus according to claim 11, wherein, when the input image is a 3D image of a top-and bottom method in which the L-side image is arranged in one of a region of an upper half and a region of a lower half of a screen, and the R-side image is arranged in the other, the memory unit reads the region of the upper half of the 3D image of the top-and bottom method as the first image, and reads the region of the lower half of the 3D image as the second image.

14. The image processing apparatus according to claim 11, wherein, when the input image is a 3D image of a frame sequential method in which the L-side image and the R-side image are alternately arranged in units of screens, the memory unit reads, in a screen of the input image, a screen of the L-side image as the first image, and reads a screen of the R-side image as the second image.

15. The image processing apparatus according to claim 11, wherein, when the input image is a 2D image, and the scan method of the display device is a single screen method in which scanning is performed in a direction from an upper left to a lower right on a display screen of the display device, the memory unit reads odd-numbered lines of the 2D image as the first image, and reads even-numbered lines of the 2D image as the second image, the acquiring unit acquires the first up-conversion line and the second up-conversion line from an image in which lines of the first image and lines of the second image are alternately arranged, and the generating unit performs
> writing lines of the first up-converted image in the first memory block and writing lines of the second up-converted image in the second memory block, and
>
> reading the lines of the first up-converted image from the first memory block and reading the lines of the second up-converted image from the second memory block.

16. An image processing method, comprising:

storing an input image and reading a part or all of the input image as a first image and a second image;

acquiring an up-conversion line that is a line of pixels used for up conversion from the first and second images;

performing up conversion using pixels of the up-conversion line, and generating a first up-converted image obtained by up converting the first image and a second up-converted image obtained by up converting the second image;

writing the first up-converted image in a first memory block and writing the second up-converted image in a second memory block;

reading pixels of the first up-converted image written in the first memory block in a certain order decided according to a scan method of a display device configured to display an output image obtained by up converting the input image, and reading pixels of the second up-converted image written in the second memory block in the certain order; and generating the output image according to the scan method of the display device, wherein, when the input image is a three dimensional (3D) image,
> in the reading of the first and second images, an L-side image viewed with a left eye in the 3D image is read as the first image, and an R-side image viewed with a right eye is read as the second image,
>
> in the acquiring of the up-conversion line, a first up-conversion line that is a line of pixels used for up conversion for generating the first up-converted image is acquired from the first image, and a second up-conversion line that is a line of pixels used for up conversion for generating the second up-converted image is acquired from the second image, and
>
> in the generating of the output image, an up-converted 3D image of a line-by-line method in which the pixels of the first up-converted image written in the first memory block and the pixels of the second up-converted image written in the second memory block are alternately arranged in units of lines is generated by up converting the 3D image; and wherein, when the input image is a two dimensional (2D) image, and the scan method of the display device is a normal cross-in-square method in which scanning is performed in a direction from an upper left to a lower right in each of four small display screens obtained by dividing a display screen of the display device in half in a horizontal direction and a vertical direction,
> in reading the first and second images, pixels of a region of an upper half of the 2D image are read as the first image in the direction from the upper left to the lower right, and pixels of a region of a lower half of the 2D image are read as the second image in the direction from the upper left to the lower right,
>
> in the acquiring of the up-conversion line, the first up-conversion line is acquired from the first image, and the second up-conversion line is acquired from the second image,
>
> in the generating of the output image, lines of the first up-converted image from a first line memory are sequentially written among four line memories of the first memory block having the four line memories each of which has a capacity of ¼ of lines of the output image, and lines of the second up-converted image from a first line memory are sequentially written among four line memories of the second memory block having the four line memories each of which has a capacity of ¼ of lines of the output image, and
>
> the following acts are simultaneously performed
>> sequentially reading the pixels of the first up-converted image from the first line memory and a second line memory among the four line memories of the first memory block in a same order as a writing order,
>>
>> sequentially reading the pixels of the first up-converted image from the third and fourth line memories among the four line memories of the first memory block in a same order as the writing order,
>>
>> sequentially reading the pixels of the second up-converted image from the first line memory and a second line memory among the four line memories of the second memory block in a same order as the writing order, and
>>
>> sequentially reading the pixels of the second up-converted image from the third and fourth line memories among the four line memories of the second memory block in a same order as the writing order.

17. A non-transitory computer-readable medium encoded with instructions that, when executed by a computer, cause the computer to function as:

a memory unit configured to store an input image and read a part or all of the input image as a first image and a second image;

an acquiring unit configured to acquire an up-conversion line that is a line of pixels used for up conversion from the first and second images;

an up-converting unit configured to perform up conversion using pixels of the up-conversion line, and generate a first up-converted image obtained by up converting the first image and a second up-converted image obtained by up converting the second image; and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device, wherein, when the input image is a three dimensional (3D) image,
> the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in units of lines by up converting the 3D image; and wherein, when the input image is a two dimensional (2D) image, and the scan method of the display device is a normal cross-in-square method in which scanning is performed in a direction from an upper left to a lower right in each of four small display screens obtained by dividing a display screen of the display device in half in a horizontal direction and a vertical direction, the memory unit reads pixels of a region of an upper half of the 2D image as the first image in the direction from the upper left to the lower right, and reads pixels of a region of a lower half of the 2D image as the second image in the direction from the upper left to the lower right, the acquiring unit acquires the first up-conversion line from the first image, and acquires the second up-conversion line from the second image, the generating unit sequentially writes lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and the generating unit simultaneously performs sequentially reading the pixels of the first up-converted image from the first line memory and a second line memory among the four line memories of the first memory block in a same order as a writing order, sequentially reading the pixels of the first up-converted image from the third and fourth line memories among the four line memories of the first memory block in a same order as the writing order, sequentially reading the pixels of the second up-converted image from the first line memory and a second line memory among the four line memories of the second memory block in a same order as the writing order, and sequentially reading the pixels of the second up-converted image from the third and fourth line memories among the four line memories of the second memory block in a same order as the writing order.

18. An image processing method, comprising:

storing an input image and reading a part or all of the input image as a first image and a second image;

acquiring an up-conversion line that is a line of pixels used for up conversion from the first and second images;

performing up conversion using pixels of the up-conversion line, and generating a first up-converted image obtained by up converting the first image and a second up-converted image obtained by up converting the second image;

writing the first up-converted image in a first memory block and writing the second up-converted image in a second memory block;

reading pixels of the first up-converted image written in the first memory block in a certain order decided according to a scan method of a display device configured to display an output image obtained by up converting the input image, and reading pixels of the second up-converted image written in the second memory block in the certain order; and generating the output image according to the scan method of the display device, wherein, when the input image is a three dimensional (3D) image, in the reading of the first and second images, an L-side image viewed with a left eye in the 3D image is read as the first image, and an R-side image viewed with a right eye is read as the second image, in the acquiring of the up-conversion line, a first up-conversion line that is a line of pixels used for up conversion for generating the first up-converted image is acquired from the first image, and a second up-conversion line that is a line of pixels used for up conversion for generating the second up-converted image is acquired from the second image, and in the generating of the output image, an up-converted 3D image of a line-by-line method in which the pixels of the first up-converted image written in the first memory block and the pixels of the second up-converted image written in the second memory block are alternately arranged in units of lines is generated by up converting the 3D image; and wherein, when the input image is a 2D image, and the scan method of the display device is a spring cross-in-square method in which scanning is performed in directions from a center of a display screen toward four corners in four small display screens obtained by dividing the display screen of the display device in half in a horizontal direction and a vertical direction, in the reading of the first and second images, pixels of a region of an upper half of the 2D image are read as the first image in a direction from a lower left to an upper right, and pixels of a region of a lower half of the 2D image as the second image are read in a direction from an upper left to a lower right, in the acquiring of the up-conversion line, the first up-conversion line is acquired from the first image, and the second up-conversion line is acquired from the second image, in the generating of the output image, lines of the first up-converted image from a first line memory are sequentially written among four line memories of the first memory block having the four line memories each of which has a capacity of ¼ of lines of the output image, and lines of the second up-converted image from a first line memory are sequentially written among four line memories of the second memory block having the four line memories each of which has a capacity of ¼ of lines of the output image, and the following acts are simultaneously performed sequentially reading the pixels of the first up-converted image from the first line memory and a second line memory among the four line memories of the first memory block in a reverse order as a writing order, sequentially reading the pixels of the first up-converted image from the third and fourth line memories among the four line memories of the first memory block in a same order as the writing order, sequentially reading the pixels of the second up-converted image from the first line memory and a second line memory among the four line memories of the second memory block in a reverse order from the writing order, and sequentially reading the pixels of the second up-converted image from the third and fourth line memories among the four line memories of the second memory block in a same order as the writing order.

19. An image processing method, comprising:

storing an input image and reading a part or all of the input image as a first image and a second image;

acquiring an up-conversion line that is a line of pixels used for up conversion from the first and second images;

performing up conversion using pixels of the up-conversion line, and generating a first up-converted image obtained by up converting the first image and a second up-converted image obtained by up converting the second image;

writing the first up-converted image in a first memory block and writing the second up-converted image in a second memory block;

reading pixels of the first up-converted image written in the first memory block in a certain order decided according to a scan method of a display device configured to display an output image obtained by up converting the input image, and reading pixels of the second up-converted image written in the second memory block in the certain order; and generating the output image according to the scan method of the display device, wherein, when the input image is a three dimensional (3D) image, in the reading of the first and second images, an L-side image viewed with a left eye in the 3D image is read as the first image, and an R-side image viewed with a right eye is read as the second image, in the acquiring of the up-conversion line, a first up-conversion line that is a line of pixels used for up conversion for generating the first up-converted image is acquired from the first image, and a second up-conversion line that is a line of pixels used for up conversion for generating the second up-converted image is acquired from the second image, and in the generating of the output image, an up-converted 3D image of a line-by-line method in which the pixels of the first up-converted image written in the first memory block and the pixels of the second up-converted image written in the second memory block are alternately arranged in units of lines is generated by up converting the 3D image; and wherein, when the input image is a 2D image, and the scan method of the display device is a bamboo blind method in which scanning is performed in a direction from an upper left to a lower right in each of four small display screens obtained by equally dividing a display screen of the display device into four in a horizontal direction, in the reading of the first and second images, odd-numbered lines of the 2D image are read as the first image, and even-numbered lines of the 2D image are read as the second image, in the acquiring of the up-conversion line, the first up-conversion line and the second up-conversion line are acquired from an image in which lines of the first image and lines of the second image are alternately arranged, and in the generating of the output image, lines of the first up-converted image from a first line memory are sequentially written among four line memories of the first memory block having the four line memories each of which has a capacity of ¼ of lines of the output image, and lines of the second up-converted image from a first line memory are sequentially written among four line memories of the second memory block having the four line memories each of which has a capacity of ¼ of lines of the output image, and the pixels of the first up-converted image are simultaneously read from the four line memories of the first memory block, and the pixels of the second up-converted image are simultaneously read from the four line memories of the second memory block.

20. A non-transitory computer-readable medium encoded with instructions that, when executed by a computer, cause the computer to function as:

a memory unit configured to store an input image and read a part or all of the input image as a first image and a second image;

an acquiring unit configured to acquire an up-conversion line that is a line of pixels used for up conversion from the first and second images;

an up-converting unit configured to perform up conversion using pixels of the up-conversion line, and generate a first up-converted image obtained by up converting the first image and a second up-converted image obtained by up converting the second image; and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device, wherein, when the input image is a three dimensional (3D) image, the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in units of lines by up converting the 3D image; and wherein, when the input image is a 2D image, and the scan method of the display device is a spring cross-in-square method in which scanning is performed in directions from a center of a display screen toward four corners in four small display screens obtained by dividing the display screen of the display device in half in a horizontal direction and a vertical direction, the memory unit reads pixels of a region of an upper half of the 2D image as the first image in a direction from a lower left to an upper right, and reads pixels of a region of a lower half of the 2D image as the second image in a direction from an upper left to a lower right, the acquiring unit acquires the first up-conversion line from the first image, and acquires the second up-conversion line from the second image, the generating unit sequentially writes lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and the generating unit simultaneously performs sequentially reading the pixels of the first up-converted image from the first line memory and a second line memory among the four line memories of the first memory block in a reverse order as a writing order, sequentially reading the pixels of the first up-converted image from the third and fourth line memories among the four line memories of the first memory block in a same order as the writing order, sequentially reading the pixels of the second up-converted image from the first line memory and a second line memory among the four line memories of the second memory block in a reverse order from the writing order, and sequentially reading the pixels of the second up-converted image from the third and fourth line memories among the four line memories of the second memory block in a same order as the writing order.

21. A non-transitory computer-readable medium encoded with instructions that, when executed by a computer, cause the computer to function as:

a memory unit configured to store an input image and read a part or all of the input image as a first image and a second image;

an acquiring unit configured to acquire an up-conversion line that is a line of pixels used for up conversion from the first and second images;

an up-converting unit configured to perform up conversion using pixels of the up-conversion line, and generate a first up-converted image obtained by up converting the first image and a second up-converted image obtained by up converting the second image; and a generating unit configured to write the first up-converted image in a first memory block, write the second up-converted image in a second memory block, read pixels of the first up-converted image written in the first memory block in a certain order decided according to a scan method of a display device configured to display an output image obtained by up converting the input image, read pixels of the second up-converted image written in the second memory block in the certain order, and generate the output image according to the scan method of the display device, wherein, when the input image is a three dimensional (3D) image, the memory unit reads, in the 3D image, an L-side image viewed with a left eye as the first image, and reads an R-side image viewed with a right eye as the second image, the acquiring unit acquires a first up-conversion line that is a line of pixels used for up conversion for generating the first up-converted image from the first image, and acquires a second up-conversion line that is a line of pixels used for up conversion for generating the second up-converted image from the second image, and the generating unit generates an up-converted 3D image of a line-by-line method in which the pixels of the first up-converted image written in the first memory block and the pixels of the second up-converted image written in the second memory block are alternately arranged in units of lines by up converting the 3D image; and wherein, when the input image is a 2D image, and the scan method of the display device is a bamboo blind method in which scanning is performed in a direction from an upper left to a lower right in each of four small display screens obtained by equally dividing a display screen of the display device into four in a horizontal direction, the memory unit reads odd-numbered lines of the 2D image as the first image, and reads even-numbered lines of the 2D image as the second image, the acquiring unit acquires the first up-conversion line and the second up-conversion line from an image in which lines of the first image and lines of the second image are alternately arranged, and the generating unit performs sequentially writing lines of the first up-converted image from a first line memory among four line memories of the first memory block having the four line memories each of which has a capacity of ¼ of lines of the output image, and sequentially writing lines of the second up-converted image from a first line memory among four line memories of the second memory block having the four line memories each of which has a capacity of ¼ of lines of the output image, and simultaneously reading the pixels of the first up-converted image from the four line memories of the first memory block, and simultaneously reading the pixels of the second up-converted image from the four line memories of the second memory block.

\* \* \* \* \*